US011852595B2

(12) United States Patent
Chang et al.

(10) Patent No.: US 11,852,595 B2
(45) Date of Patent: Dec. 26, 2023

(54) PLASTIC LENS ELEMENT AND IMAGING LENS ASSEMBLY

(71) Applicant: LARGAN PRECISION CO., LTD., Taichung (TW)

(72) Inventors: Lin-An Chang, Taichung (TW); Ming-Ta Chou, Taichung (TW); Cheng-Feng Lin, Taichung (TW); Liang-Chieh Weng, Taichung (TW); Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 531 days.

(21) Appl. No.: 17/019,421

(22) Filed: Sep. 14, 2020

(65) Prior Publication Data
US 2021/0364452 A1 Nov. 25, 2021

(30) Foreign Application Priority Data
May 22, 2020 (TW) .................................. 109117244

(51) Int. Cl.
*G01N 21/958* (2006.01)
*G02B 3/04* (2006.01)
(Continued)

(52) U.S. Cl.
CPC ..... *G01N 21/958* (2013.01); *B29D 11/00009* (2013.01); *G02B 1/04* (2013.01); *G02B 3/04* (2013.01); *G01N 2021/9583* (2013.01)

(58) Field of Classification Search
CPC .......... G02B 1/041; G02B 7/025; G02B 5/22; G02B 3/0025; G02B 3/0012; G02B 3/0031; G02B 3/0006; G02B 3/00; G02B 13/008; G02B 13/001; G02B 13/0015; G02B 13/0055; G02B 13/002; G02B 13/0045; G02B 1/04; G02B 3/04; G02B 7/022; G02B 7/021; G02B 7/02; G01N 21/958;
(Continued)

(56) References Cited

U.S. PATENT DOCUMENTS 5,946,142 A * 8/1999 Hirata .................... G02B 13/06
359/713
9,952,359 B2 4/2018 Chang
(Continued)

FOREIGN PATENT DOCUMENTS

TW I616698 B 3/2018
TW I625557 B 6/2018
(Continued)

*Primary Examiner* — William Choi
*Assistant Examiner* — Ray Alexander Dean
(74) *Attorney, Agent, or Firm* — McClure, Qualey & Rodack, LLP

(57) ABSTRACT

A plastic lens element includes an optical effective portion and a peripheral portion. The peripheral portion surrounds the optical effective portion and includes a peripheral surface and an optical inspecting structure. The optical inspecting structure is disposed between the optical effective portion and the peripheral surface and includes a first optical inspecting surface and a second optical inspecting surface. The first optical inspecting surface and the second optical inspecting surface are disposed on two sides of the peripheral portion respectively and correspond to each other.

24 Claims, 25 Drawing Sheets

(51) Int. Cl.
  *B29D 11/00* (2006.01)
  *G02B 1/04* (2006.01)
(58) Field of Classification Search
  CPC ....... G01N 2021/9583; G01N 21/8803; B29D
    11/00009; G01M 11/0221; G01M
    11/0278; G01M 11/0207; G01M 11/0257;
    G03B 17/12
  USPC .................................................. 359/642, 741
  See application file for complete search history.

(56) References Cited

U.S. PATENT DOCUMENTS

| | | | |
|---|---|---|---|
| 10,018,808 | B2 | 7/2018 | Chou |
| 10,114,152 | B2 | 10/2018 | Chou |
| 10,234,658 | B2 | 3/2019 | Lin et al. |
| 10,502,873 | B2 | 12/2019 | Chou |
| 10,514,481 | B2 | 12/2019 | Chang et al. |
| 10,564,383 | B2 | 2/2020 | Chou |
| 2005/0117048 | A1* | 6/2005 | Matsushita ......... B29C 65/1648 348/340 |
| 2017/0027361 | A1* | 2/2017 | Santiago .................... F21V 1/04 |
| 2019/0018171 | A1* | 1/2019 | Chang .................. G02B 5/0284 |
| 2019/0025600 | A1* | 1/2019 | Tang ........................ G02B 9/60 |

FOREIGN PATENT DOCUMENTS

| | | | |
|---|---|---|---|
| TW | I639029 | B | 10/2018 |
| TW | I657281 | B | 4/2019 |

\* cited by examiner

130

1332

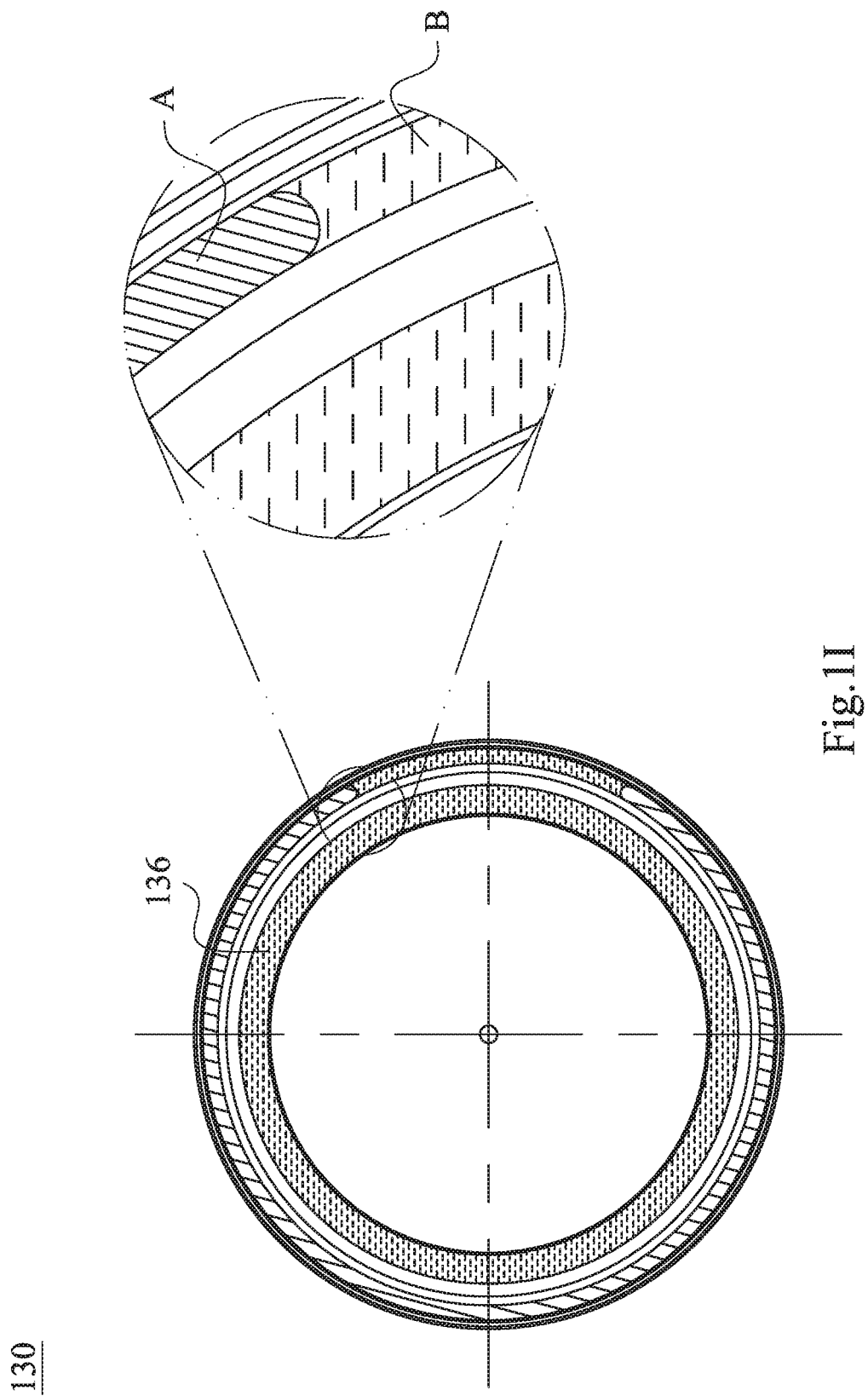

230

230

240

PLASTIC LENS ELEMENT AND IMAGING LENS ASSEMBLY

RELATED APPLICATIONS

This application claims priority to Taiwan Application Serial Number 109117244, filed May 22, 2020, which is herein incorporated by reference in its entirety.

BACKGROUND

Technical Field

The present disclosure relates to a plastic lens element and an imaging lens assembly. More particularly, the present disclosure relates to a plastic lens element having an optical inspecting structure and an imaging lens assembly having the same.

Description of Related Art

Portable electronic devices, such as intelligent electronic devices, tablets, etc., have been developed rapidly and widely used by modern people in recent years. Imaging lens assemblies loaded on the portable electronic devices and imaging lens elements thereof are widely studied therefore. The demand for quality of the imaging lens assemblies increases along with the advances in technology. In the current process of manufacturing of the imaging lens assemblies, it cannot be known whether adhesive are coated completely and whether the imaging lens elements of the imaging lens assemblies are tilt after assembling. The only way to check the assembling of the imaging lens elements and the coating situation of adhesive is by the appearance of the imaging lens assemblies manufactured. Thus, an imaging lens assembly with miniaturization and good image quality and capable to be manufactured in a high process yield rate is desired.

SUMMARY

According to one aspect of the present disclosure, a plastic lens element includes an optical effective portion and a peripheral portion. The peripheral portion surrounds the optical effective portion and includes a peripheral surface and an optical inspecting structure. The optical inspecting structure is disposed between the optical effective portion and the peripheral surface. The optical inspecting structure includes a first optical inspecting surface and a second optical inspecting surface, wherein the first optical inspecting surface and the second optical inspecting surface are disposed on two sides of the peripheral portion respectively and correspond to each other. When an angle between the first optical inspecting surface and the second optical inspecting surface is θi, the following condition is satisfied:

30 degrees≤θi≤60 degrees.

According to another aspect of the present disclosure, an imaging lens assembly includes a plastic lens barrel and an imaging lens set. The imaging lens set is accommodated in the plastic lens barrel and includes at least one plastic lens element according to the aforementioned aspect.

BRIEF DESCRIPTION OF THE DRAWINGS

The present disclosure can be more fully understood by reading the following detailed description of the embodiment, with reference made to the accompanying drawings as follows:

FIG. 1I is a schematic view showing another inspection situation of the plastic lens element according to the 1st embodiment of FIG. 1A.

DETAILED DESCRIPTION

Figure 1A:
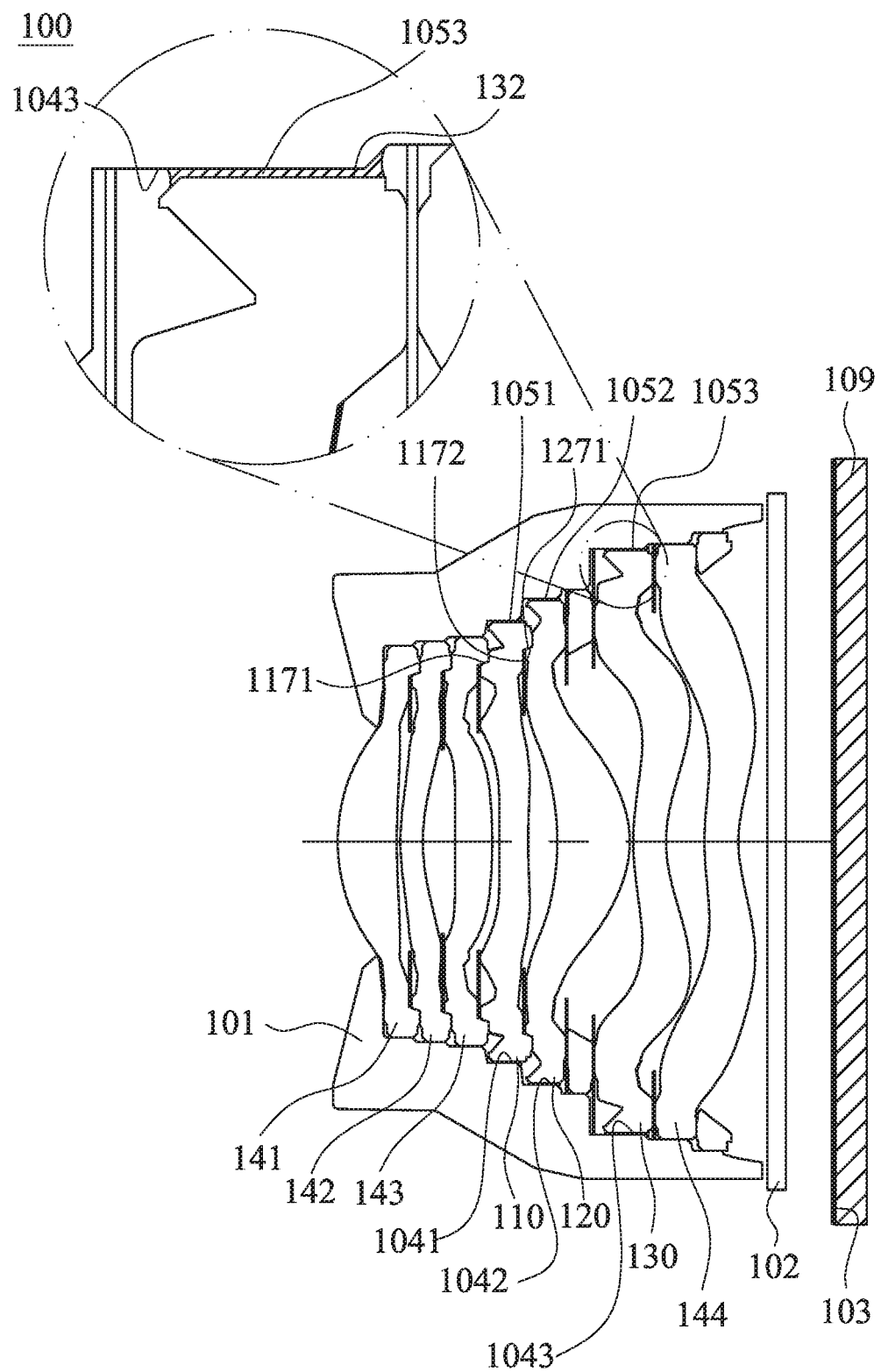
FIG. 1A is a schematic view of an imaging lens assembly according to the 1st embodiment of the present disclosure.

The present disclosure provides a plastic lens element which includes an optical effective portion and a peripheral portion. The peripheral portion surrounds the optical effective portion and includes a peripheral surface and an optical inspecting structure. The optical inspecting structure is disposed between the optical effective portion and the peripheral surface. The optical inspecting structure includes a first optical inspecting surface and a second optical inspecting surface, wherein the first optical inspecting surface and the second optical inspecting surface are disposed on two sides of the peripheral portion respectively and correspond to each other. In detail, the peripheral surface is connected to the two sides of the peripheral portion. The assembling situation inside an imaging lens assembly where the plastic lens element is disposed can be monitored by the optical inspecting structure. After qualified, subsequent assembling processes shall be continued. Thus, it is favorable for improving assembling yield rate and saving raw materials for manufacturing.

When an angle between the first optical inspecting surface and the second optical inspecting surface is $\theta i$, the following condition is satisfied: 30 degrees$\leq \theta i \leq$60 degrees. Therefore, a light for inspecting images can be transmitted out of the plastic lens element that is favorable for providing feasibility of optical inspecting.

Accordingly, the present disclosure provides the plastic lens element by which the assembling quality can be real-time monitored. The optical inspecting structure is directly disposed on the plastic lens element by injection molding process, as a result, the quick and low-cost inspection is achieved. Thus, it is favorable for further improving the yield rate and the production of the imaging lens assembly.

Moreover, the following condition can be satisfied: 35 degrees$\leq \theta i \leq$55 degrees. Therefore, it is favorable for achieving a structure with total internal reflection more easily and shrinkage and warpage of the structure can be avoided during molding.

When a minimum diameter of the second optical inspecting surface is $\psi i$, and a maximum diameter of the peripheral surface is 4$\psi d$, the following condition is satisfied: 0.80<4$\psi i$/$\psi d$<0.99. Therefore, it is favorable for optical inspecting structure clearly reflecting an image of the peripheral surface. Furthermore, the following condition can be satisfied: 0.85$\leq$4$\psi i$/$\psi d \leq$0.96. Therefore, it is favorable for providing better molding efficiency of the plastic lens element.

The optical effective portion can include at least one surface being optical aspheric. Therefore, it is favorable for providing higher resolution by reducing optical aberrations. Furthermore, the at least one surface being optical aspheric can include at least one inflection point. Therefore, it is favorable for reducing the volume of the plastic lens element and decreasing the image deformation during optical imaging.

The peripheral portion can further include an annular auxiliary surface. The annular auxiliary surface and the second optical inspecting surface are disposed on the same side, and an annular groove is formed by the annular auxiliary surface and the second optical inspecting surface. Therefore, it is favorable for maintaining the entire structure of the optical inspecting structure during injection molding process.

The peripheral surface is closer to the optical inspecting structure than the optical effective portion to the optical inspecting structure. Therefore, it is favorable for monitoring information of the peripheral surface more completely and maintaining size accuracy of the optical effective portion.

The plastic lens element can further include a light absorbing layer. The light absorbing layer is disposed on at least one of the two sides of the peripheral portion and located between the optical effective portion and the optical inspecting structure. Therefore, it is favorable for reducing the occurrence probability of the stray light. In detail, an area between the optical effective portion and the optical inspecting structure is where the stray light occurs more easily. For this reason, the light absorbing layer can be disposed between the optical effective portion and the optical inspecting structure. Moreover, the light absorbing layer can further be disposed on the annular auxiliary surface and be made of black ink for absorbing non-imaging light, but the present disclosure is not limited thereto.

When the angle between the first optical inspecting surface and the second optical inspecting surface is $\theta i$, and a critical angle of total internal reflection of the plastic lens element is $\theta c$, the following condition is satisfied: $\theta i > \theta c$. Therefore, it is favorable for providing clearer inspection images so as to avoid misjudgments. In detail, when the critical angle of total internal reflection of the plastic lens element is $\theta c$, and a refractive index of the plastic lens element is Nd, there is a relationship between $\theta c$ and Nd that is: $\theta c = \sin^{-1}(1/Nd)$. The light for inspecting image is transmitted by total internal reflection so that energy loss thereof can be reduced, easier determination can be achieved due to better image contrast, and coating of reflecting film will be unnecessary.

The following table shows the data of the critical angle of total internal reflection and the refractive index of each of Material 1 to Material 20 (a reference wavelength is 587.56 nm). The plastic lens element of the present disclosure can be made of any one of the Material 1 to Material 20 but it is not limited thereto.

| Material name | Refractive index Nd | Critical angle of total internal reflection $\theta c$ |
| --- | --- | --- |
| Material 1 | 1.512 | 41.4 |
| Material 2 | 1.535 | 40.7 |
| Material 3 | 1.536 | 40.6 |
| Material 4 | 1.544 | 40.4 |
| Material 5 | 1.566 | 39.7 |
| Material 6 | 1.585 | 39.1 |
| Material 7 | 1.586 | 39.1 |
| Material 8 | 1.588 | 39.0 |
| Material 9 | 1.614 | 38.3 |
| Material 10 | 1.614 | 38.3 |
| Material 11 | 1.636 | 37.7 |
| Material 12 | 1.640 | 37.6 |
| Material 13 | 1.640 | 37.6 |
| Material 14 | 1.644 | 37.5 |
| Material 15 | 1.657 | 37.1 |
| Material 16 | 1.661 | 37.0 |
| Material 17 | 1.670 | 36.8 |
| Material 18 | 1.680 | 36.5 |
| Material 19 | 1.686 | 36.4 |
| Material 20 | 1.705 | 35.9 |

When the refractive index of the plastic lens element is Nd, the following condition is satisfied: 1.50<Nd<1.75, wherein the refractive index is measured under d light whose wavelength is 587.56 nm. Therefore, it is favorable for achieving a range of the refractive index of total internal reflection more easily.

The plastic lens element can be a dual molded lens element formed integrally of a transparent portion and a black portion. Specifically, the transparent portion can be penetrated by a visible light and the black portion can be penetrated by an infrared light. The wavelength of the infrared light can be 700 nm to 1000 nm but it is not limited thereto. Therefore, it is favorable for separating light source for inspecting and light source for imaging so as to directly prevent the optical inspecting structure from the stray light being occurred.

The first optical inspecting surface and the second optical inspecting surface can be both smooth surfaces. Specifically, smooth surfaces have a roughness Ra being less than 0.01 μm and are optical surfaces with less scattering. Therefore, it is favorable for reducing scattering of the light for inspecting image so as to prevent images being blurred.

When a minimum thickness between the first optical inspecting surface and the second optical inspecting surface is IT, the following condition is satisfied: 0.1 mm<IT<0.6 mm. Therefore, it is favorable for reducing a space occupied by the optical inspecting structure so as to maintain a size range of small volume.

When the minimum thickness between the first optical inspecting surface and the second optical inspecting surface is IT, and a central thickness of the plastic lens element is CT, the following condition is satisfied: 0.2<IT/CT<1.4. Therefore, it is favorable for providing a size range of manufacturability of molding of the center and the periphery of the plastic lens element. Further, the following condition can be satisfied: $0.3 \leq IT/CT \leq 1.2$. Therefore, it is favorable for achieving a thickness ratio under a condition of better plastic molding fluidity.

The present disclosure provides an imaging lens assembly which includes a plastic lens barrel and an imaging lens set. The imaging lens set is accommodated in the plastic lens barrel and includes at least one plastic lens element as describe above. Thus, assembling inspection of the plastic lens element is provided during assembling of the imaging lens assembly so that the imaging lens assembly being stable and having better imaging quality can be achieved.

The peripheral portion can further include two receiving surfaces which are disposed on the two sides of the peripheral portion respectively and parallel to each other substantially. Therefore, it is favorable for providing a benchmark surface so as to maintain the interval between each two components. Specifically, the two receiving surfaces are used for mutually receiving optical components adjacent thereto. Each of the optical components can be an imaging lens element, a light blocking sheet, a spacer or a retainer, but the present disclosure is not limited thereto.

The first optical inspecting surface can be one of the two receiving surfaces. Therefore, inspecting and receiving are on the same flat surface so that a better spatial arrangement can be achieved.

The peripheral portion can further include an axial aligning structure for coaxially disposing the plastic lens element and an imaging lens element adjacent thereto. Therefore, it is favorable for improving the coating uniformity of adhesive by providing a better coaxial ratio and maintaining the interval between the plastic lens element and the plastic barrel.

The plastic lens barrel has at least one parallel inner annular surface, and a gap is formed between the peripheral surface of the plastic lens element and the at least one parallel inner annular surface of the plastic lens barrel. The imaging lens assembly can further include an adhesive disposed in the gap to bond the plastic lens element and the plastic lens barrel. Therefore, it is favorable for enhancing structural stability of the plastic lens element during assembling and maintaining good optical quality of the imaging lens assembly. In detail, the adhesive can be a colorless material or a black material which depend on demand for stabilizing components and shielding non-imaging light. The optical inspecting structure can inspect the completeness of the adhesive coating on the peripheral surface.

The plastic lens barrel has a parallel inner annular surface, and the peripheral surface of the plastic lens element and the parallel inner annular surface of the plastic lens barrel are correspondingly connected to each other. By controlling size accuracy, the plastic lens element has better alignment and the imaging lens assembly maintains good optical quality. Moreover, the optical inspecting structure can further inspect decenter and tilt between the plastic lens element and the plastic barrel.

When the angle between the first optical inspecting surface and the second optical inspecting surface is θi, the following condition is satisfied: $35 \text{ degrees} \leq \theta i \leq 55 \text{ degrees}$. Therefore, it is favorable for achieving the structure with total internal reflection more easily and shrinkage and warpage of the structure can be avoided during molding.

When the refractive index of the plastic lens element is Nd, the following condition is satisfied: 1.50<Nd<1.75. Therefore, it is favorable for achieving the range of the refractive index of total internal reflection more easily.

When the angle between the first optical inspecting surface and the second optical inspecting surface is θi, and the critical angle of total internal reflection of the plastic lens element is θc, the following condition is satisfied: θi>θc. Therefore, it is favorable for providing clearer inspection images so as to avoid misjudgments.

According to the above description of the present disclosure, the following specific embodiments are provided for further explanation.

1st Embodiment

FIG. 1A is a schematic view of an imaging lens assembly 100 according to the 1st embodiment of the present disclosure. As shown in FIG. 1A, the imaging lens assembly 100 includes a plastic lens barrel 101 and an imaging lens set (its reference numeral is omitted). The imaging lens set is accommodated in the plastic lens barrel 101. Moreover, the imaging lens assembly 100 can further include a filter 102 and an image sensor 109. The filter 102 is disposed between the imaging lens set and an image surface 103. The image sensor 109 is disposed on the image surface 103.

The imaging lens set includes, in order from an object side to an image side, an imaging lens element 141, an imaging lens element 142, an imaging lens element 143, a plastic lens element 110, a plastic lens element 120, a plastic lens element 130 and an imaging lens element 144. Moreover, optical components such as a light blocking sheet, a spacer, or a retainer can be disposed depending on demand between the imaging lens element and the plastic lens element adjacent thereto in the imaging lens set, and reference numbers and explanation thereof will not be further provided.

Figure 1B:
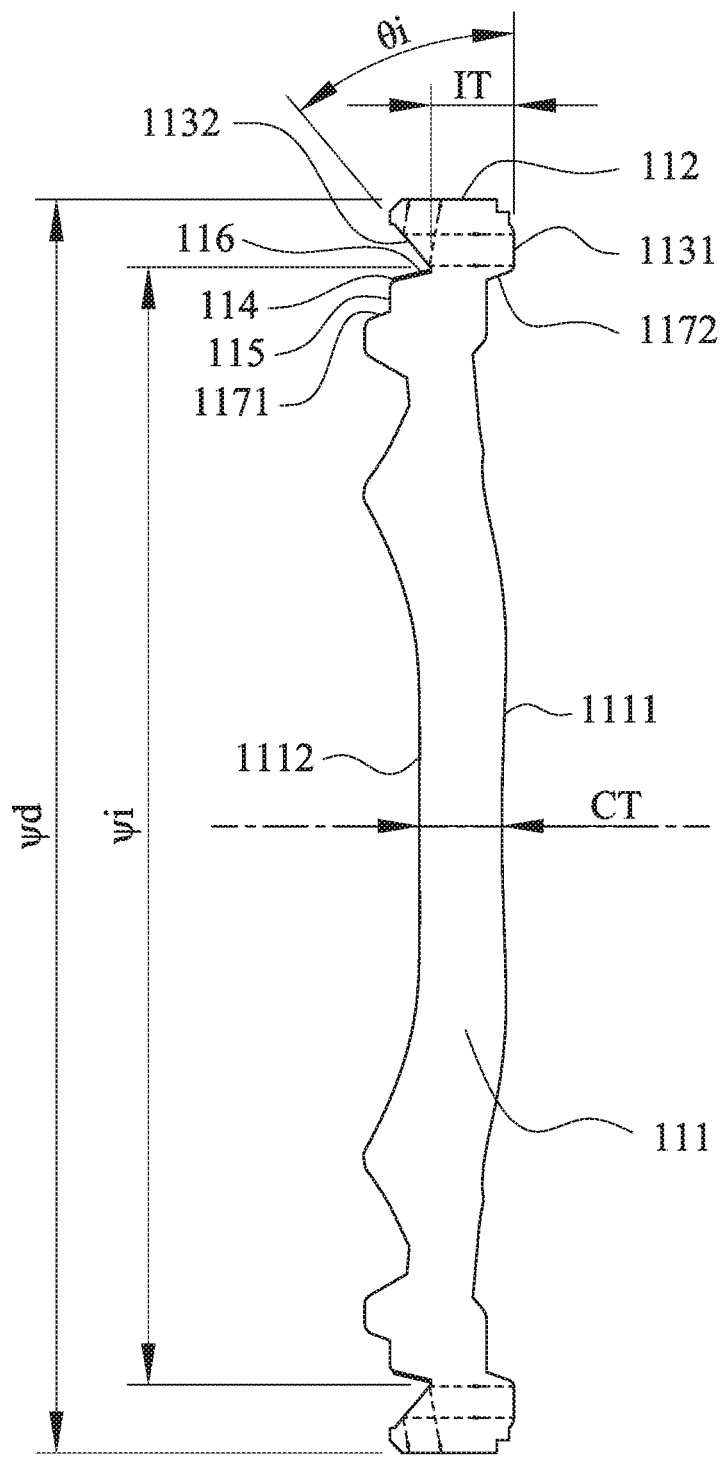
FIG. 1B is a schematic view of a plastic lens element according to the 1st embodiment of FIG. 1A.

FIG. 1B is a schematic view of the plastic lens element 110 according to the 1st embodiment of FIG. 1A. As shown in FIG. 1B, the plastic lens element 110 includes an optical effective portion 111 and a peripheral portion (its reference numeral is omitted). The peripheral portion surrounds the optical effective portion 111, and includes a peripheral surface 112, an optical inspecting structure (its reference numeral is omitted) and an annular auxiliary surface 114. The optical inspecting structure is disposed between the optical effective portion 111 and the peripheral surface 112. The optical inspecting structure includes a first optical inspecting surface 1131 and a second optical inspecting surface 1132, in which the first optical inspecting surface 1131 and the second optical inspecting surface 1132 are disposed on two sides of the peripheral portion respectively and correspond to each other. The annular auxiliary surface 114 and the second optical inspecting surface 1132 are disposed on the same side, and an annular groove is formed by the annular auxiliary surface 114 and the second optical inspecting surface 1132.

The optical effective portion 111 includes two surfaces being optical aspheric (that is, both of the object-side surface and the image-side surface are optical aspheric), and each of the two surfaces being optical aspheric includes at least one inflection point 1111, 1112. In the plastic lens element 110, the peripheral surface 112 is closer to the optical inspecting structure than the optical effective portion 111 to the optical inspecting structure. The first optical inspecting surface 1131 and the second optical inspecting surface 1132 are both smooth surfaces. Moreover, the peripheral portion can further include two receiving surfaces disposed on the two sides of the peripheral portion respectively and parallel to each other substantially. In detail, for the plastic lens element 110, one receiving surface is a receiving surface 115 and the other receiving surface is the first optical inspecting surface 1131. Further, the plastic lens element 110 can further include a light absorbing layer 116 disposed on at least one of the two sides of the peripheral portion (that is, the object side) and located between the optical effective portion 111 and the optical inspecting structure. Specifically, the light absorbing layer 116 of the plastic lens element 110 is disposed on the annular auxiliary surface 114.

As shown in FIG. 1B, when an angle between the first optical inspecting surface 1131 and the second optical inspecting surface 1132 is θi, a minimum diameter of the second optical inspecting surface 1132 is Wi, a maximum diameter of the peripheral surface 112 is Wd, a critical angle of total internal reflection of the plastic lens element 110 is θc, a refractive index of the plastic lens element 110 is Nd, a minimum thickness between the first optical inspecting surface 1131 and the second optical inspecting surface 1132 is IT, and a central thickness of the plastic lens element 110 is CT, the conditions in the following table are satisfied.

| The 1st Embodiment - The plastic lens element 110 | | | |
|---|---|---|---|
| θi (degree) | 40 | θc (degree) | 37.0 |
| ψi (mm) | 4.503 | IT (mm) | 0.334 |
| ψd (mm) | 5.05 | CT (mm) | 0.332 |
| ψi/ψd | 0.892 | IT/CT | 1.01 |
| Nd | 1.661 | | |

Moreover, the plastic lens element 110 satisfies the condition: θi>θc.

Figure 1C:
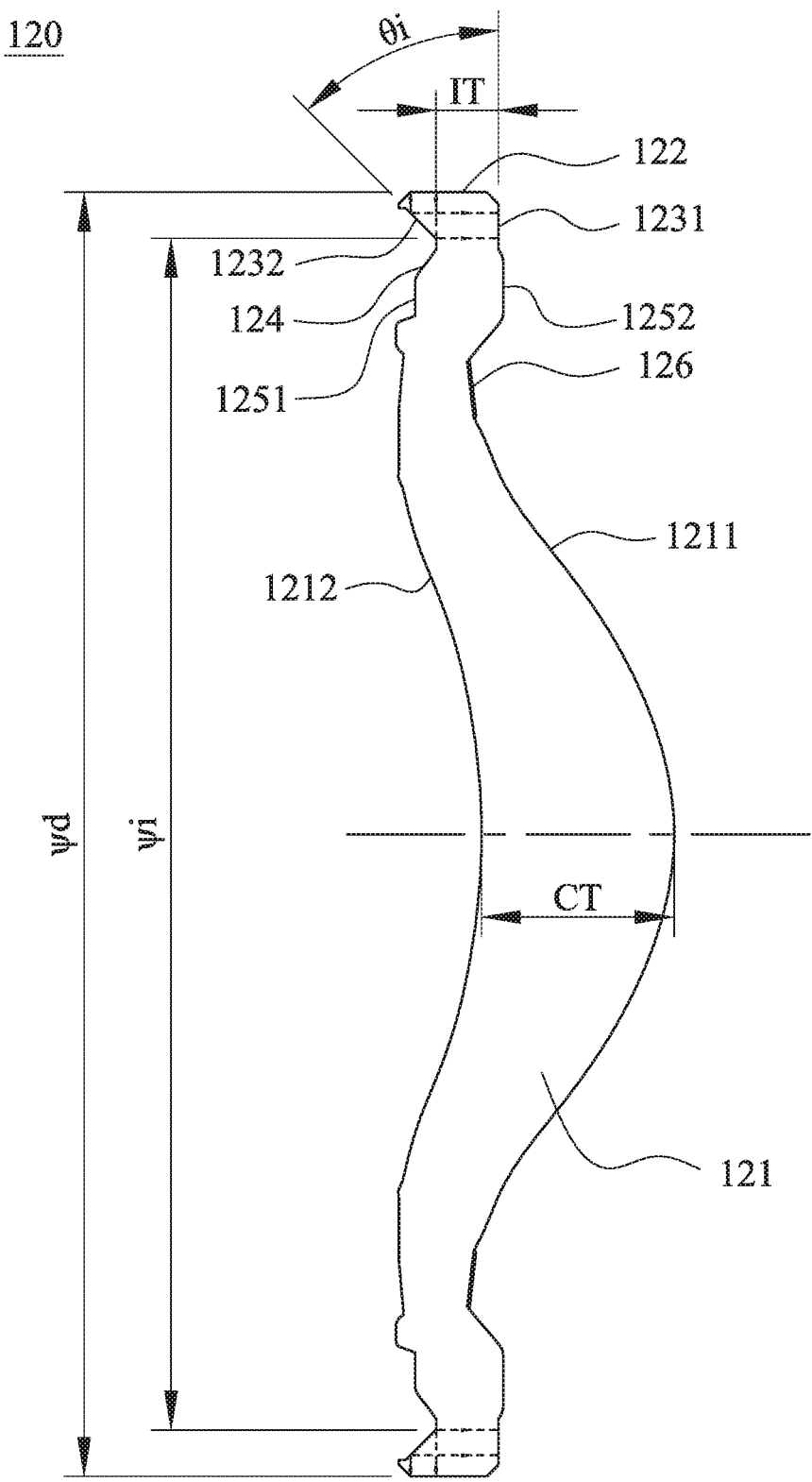
FIG. 1C is a schematic view of a plastic lens element according to the 1st embodiment of FIG. 1A.

FIG. 1C is a schematic view of the plastic lens element 120 according to the 1st embodiment of FIG. 1A. As shown in FIG. 1C, the plastic lens element 120 includes an optical effective portion 121 and a peripheral portion (its reference numeral is omitted). The peripheral portion surrounds the optical effective portion 121 and includes a peripheral surface 122, an optical inspecting structure (its reference numeral is omitted) and an annular auxiliary surface 124. The optical inspecting structure is disposed between the optical effective portion 121 and the peripheral surface 122. The optical inspecting structure includes a first optical inspecting surface 1231 and a second optical inspecting surface 1232, in which the first optical inspecting surface 1231 and the second optical inspecting surface 1232 are disposed on two sides of the peripheral portion respectively and correspond to each other. The annular auxiliary surface 124 and the second optical inspecting surface 1232 are disposed on the same side, and an annular groove is formed by the annular auxiliary surface 124 and the second optical inspecting surface 1232.

The optical effective portion 121 includes two surfaces being optical aspheric (that is, both of the object-side surface and the image-side surface are optical aspheric), and each of the two surfaces being optical aspheric includes at least one inflection point 1211, 1212. In the plastic lens element 120, the peripheral surface 122 is closer to the optical inspecting structure than the optical effective portion 121 to the optical inspecting structure. The first optical inspecting surface 1231 and the second optical inspecting surface 1232 are both smooth surfaces. Moreover, the peripheral portion can further include two receiving surfaces disposed on the two sides of the peripheral portion respectively and parallel to each other substantially. In detail, for the plastic lens element 120, one receiving surface is a receiving surface 1251 and the other receiving surface is a receiving surface 1252. Further, the plastic lens element 120 can further include a light absorbing layer 126 disposed on at least one of the two sides of the peripheral portion (that is, the image side) and located between the optical effective portion 121 and the optical inspecting structure.

As shown in FIG. 1C, the plastic lens element 120 satisfies the conditions listed in the following table. The definitions of parameters listed in the following table are the same as those described in the plastic lens element 110 with corresponding values for the plastic lens element 120, so explanation in this regard will not be provided again.

| The 1st Embodiment - The plastic lens element 120 | | | |
|---|---|---|---|
| θi (degree) | 45 | θc (degree) | 40.4 |
| ψi (mm) | 5.15 | IT (mm) | 0.27 |
| ψd (mm) | 5.55 | CT (mm) | 0.832 |
| ψi/ψd | 0.928 | IT/CT | 0.32 |
| Nd | 1.544 | | |

Figure 1D:
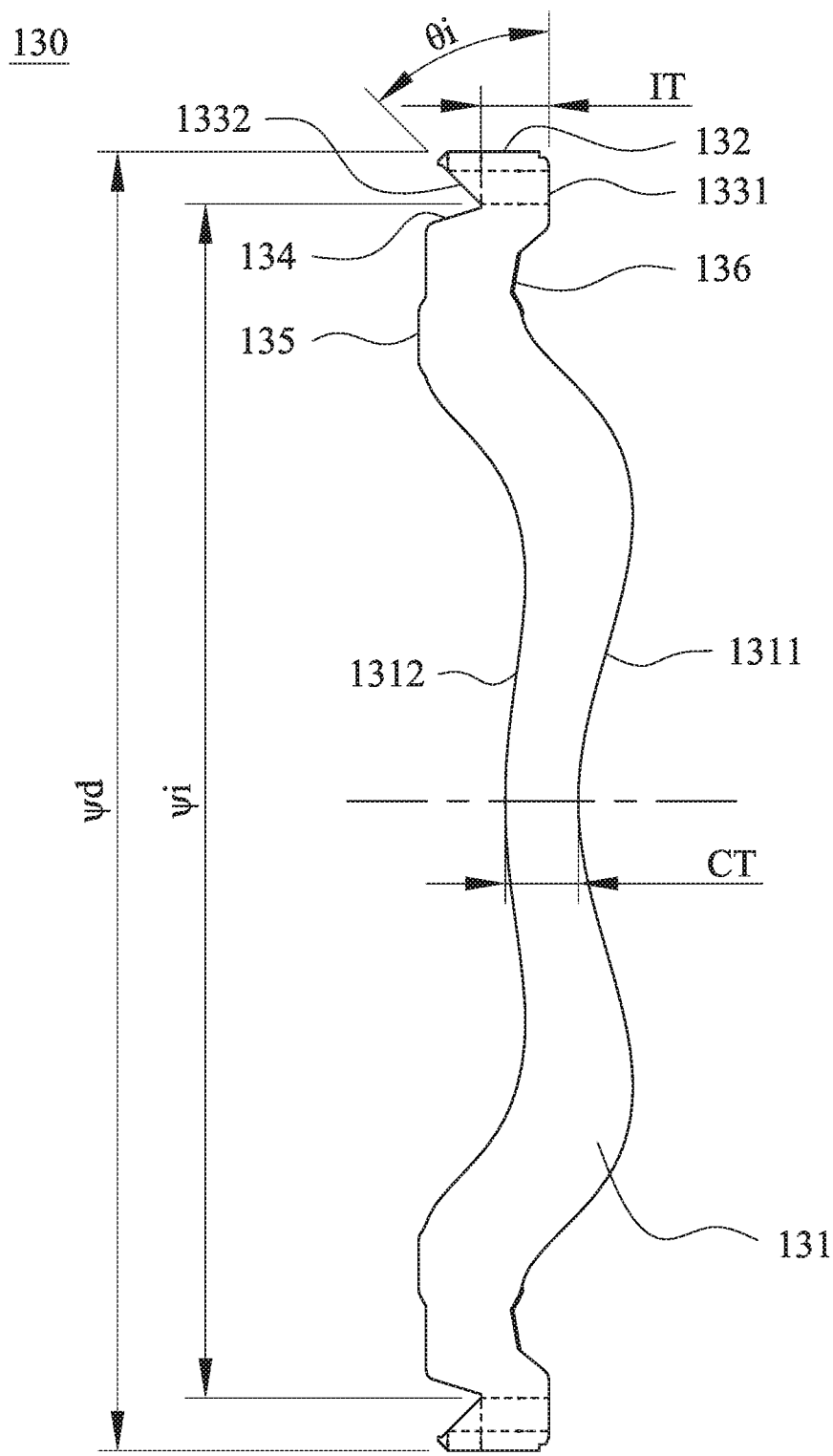
FIG. 1D is a schematic view of a plastic lens element according to the 1st embodiment of FIG. 1A.

FIG. 1D is a schematic view of the plastic lens element 130 according to the 1st embodiment of FIG. 1A. As shown in FIG. 1D, the plastic lens element 130 includes an optical effective portion 131 and a peripheral portion (its reference numeral is omitted). The peripheral portion surrounds the optical effective portion 131 and includes a peripheral surface 132, an optical inspecting structure (its reference numeral is omitted) and an annular auxiliary surface 134. The optical inspecting structure is disposed between the optical effective portion 131 and the peripheral surface 132. The optical inspecting structure includes a first optical inspecting surface 1331 and a second optical inspecting surface 1332, in which the first optical inspecting surface 1331 and the second optical inspecting surface 1332 are disposed on two sides of the peripheral portion respectively and correspond to each other. The annular auxiliary surface 134 and the second optical inspecting surface 1332 are disposed on the same side, and an annular groove is formed by the annular auxiliary surface 134 and the second optical inspecting surface 1332.

The optical effective portion 131 includes two surfaces being optical aspheric (that is, both of the object-side surface and the image-side surface are optical aspheric), and each of the two surfaces being optical aspheric includes at least one inflection point 1311, 1312. In the plastic lens element 130, the peripheral surface 132 is closer to the optical inspecting structure than the optical effective portion 131 to the optical inspecting structure. The first optical inspecting surface 1331 and the second optical inspecting surface 1332 are both smooth surfaces. Moreover, the peripheral portion can further include two receiving surfaces disposed on the two sides of the peripheral portion respectively and parallel to each other substantially. In detail, for the plastic lens element 130, one receiving surface is a receiving surface 135 and the other receiving surface is the first optical inspecting surface 1331. Further, the plastic lens element 130 can further include a light absorbing layer 136 disposed on at least one of the two sides of the peripheral portion (that is, the image side) and located between the optical effective portion 131 and the optical inspecting structure.

As shown in FIG. 1D, the plastic lens element 130 satisfies the conditions listed in the following table. The definitions of parameters listed in the following table are the same as those described in the plastic lens element 110 with corresponding values for the plastic lens element 130, so explanation in this regard will not be provided again.

| The 1st Embodiment - The plastic lens element 130 | | | |
|---|---|---|---|
| θi (degree) | 45 | θc (degree) | 40.4 |
| ψi (mm) | 6.15 | IT (mm) | 0.35 |
| ψd (mm) | 6.69 | CT (mm) | 0.375 |
| ψi/ψd | 0.919 | IT/CT | 0.93 |
| Nd | 1.544 | | |

Please refer to FIGS. 1A-1C, the peripheral portion of the plastic lens element 110 can further include two axial aligning structures 1171, 1172, which are located on the object side and the image side of the plastic lens element 110, respectively. The peripheral portion of the plastic lens element 120 can further include an axial aligning structure 1271 located on the object side of the plastic lens element 120. The axial aligning structure 1171 is for coaxially disposing the plastic lens element 110 and the imaging lens element 143 adjacent to the plastic lens element 110. The axial aligning structure 1172 is for coaxially disposing the plastic lens element 110 and an imaging lens element (that is, the plastic lens element 120) adjacent to the plastic lens element 110. Specifically, the axial aligning structure 1172 connects the axial aligning structure 1271 of the plastic lens element 120.

Figure 1E:
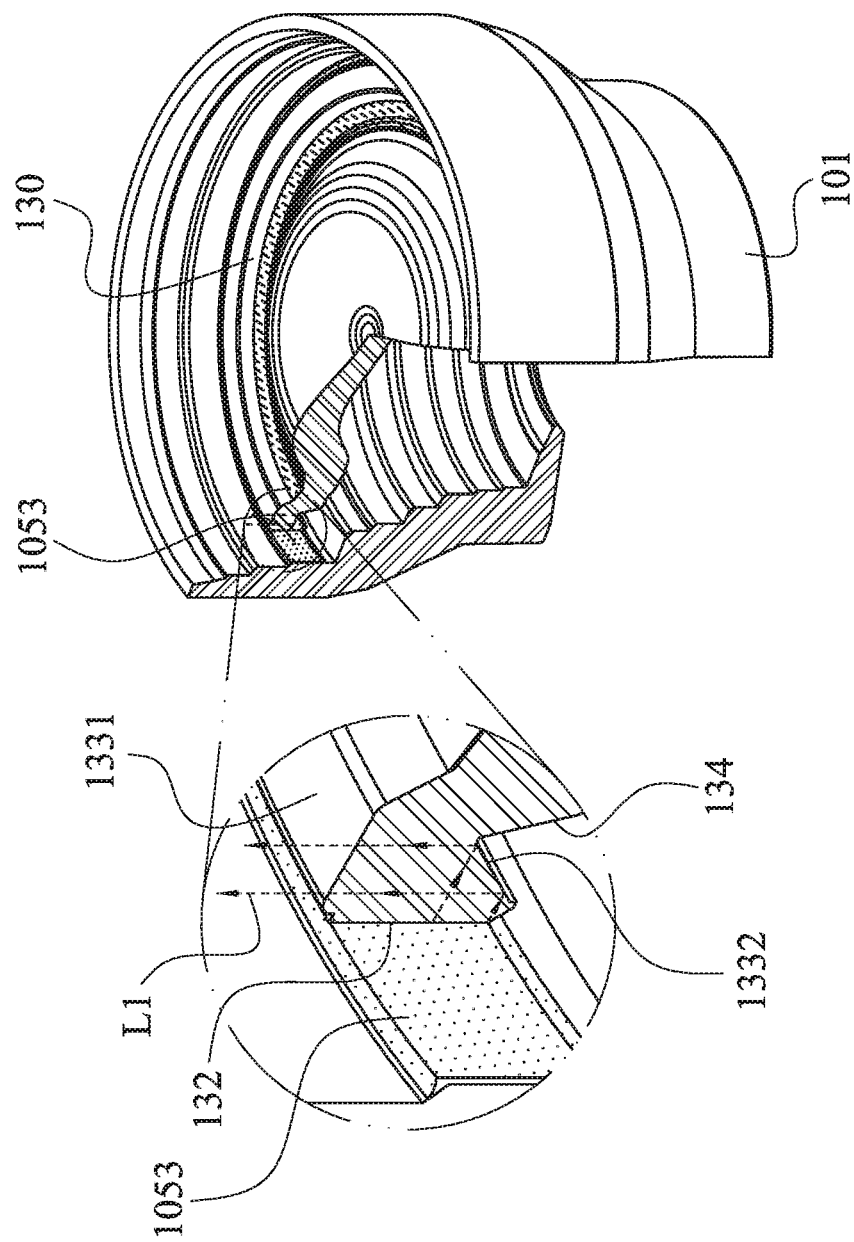
FIG. 1E is a partial cross-sectional view of a plastic lens barrel and the plastic lens element according to the 1st embodiment of FIG. 1A.

FIG. 1E is a partial cross-sectional view of the plastic lens barrel 101 and the plastic lens element 130 according to the 1st embodiment of FIG. 1A. As shown in FIGS. 1A-1E, the plastic lens barrel 101 has parallel inner annular surfaces 1041, 1042, 1043. A gap (its reference numeral is omitted) is formed between each of the peripheral surfaces 112, 122, 132 of the plastic lens elements 110, 120, 130 and each of the parallel inner annular surfaces 1041, 1042, 1043 of the plastic lens barrel 101, respectively. The imaging lens assembly 100 can further include adhesives 1051, 1052, 1053 disposed in the gaps, respectively. The adhesives 1051, 1052, 1053 are for bonding the plastic lens elements 110, 120, 130 and the plastic lens barrel 101, respectively.

Figure 1F:
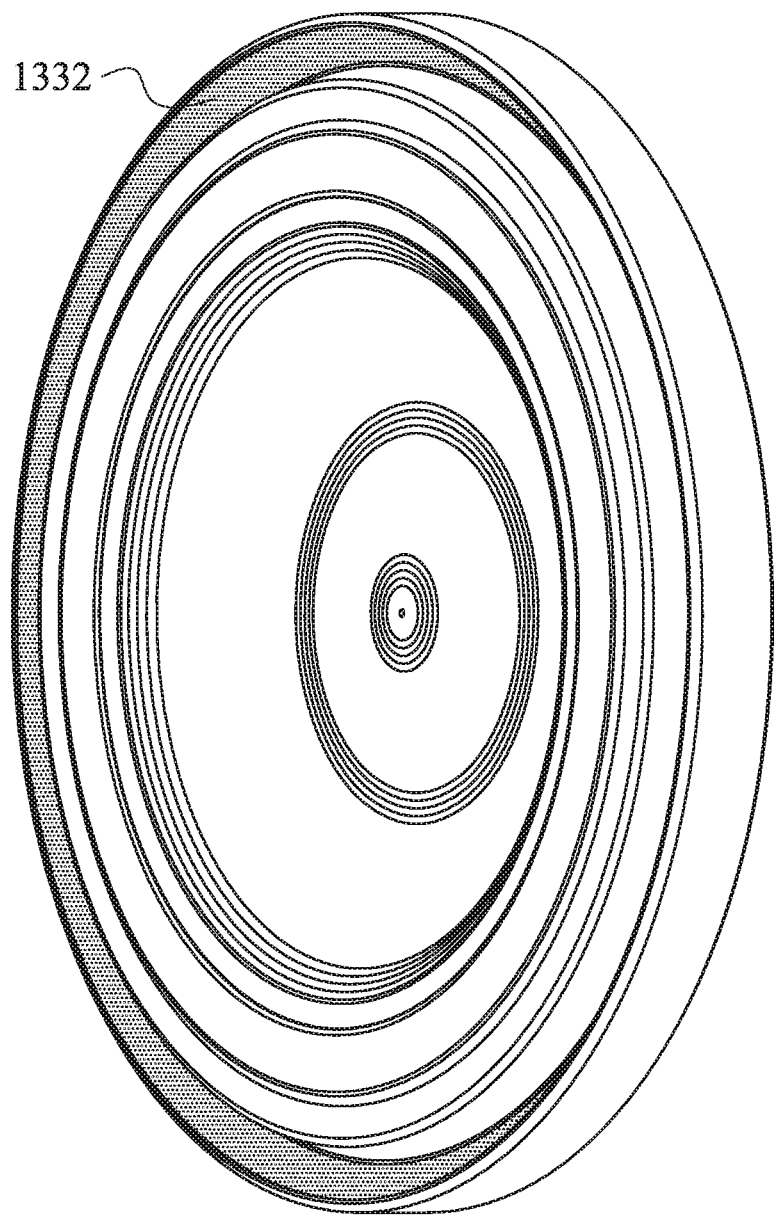
FIG. 1F is a three dimensional schematic view of the plastic lens element according to the 1st embodiment of FIG. 1A.
Figure 1G:
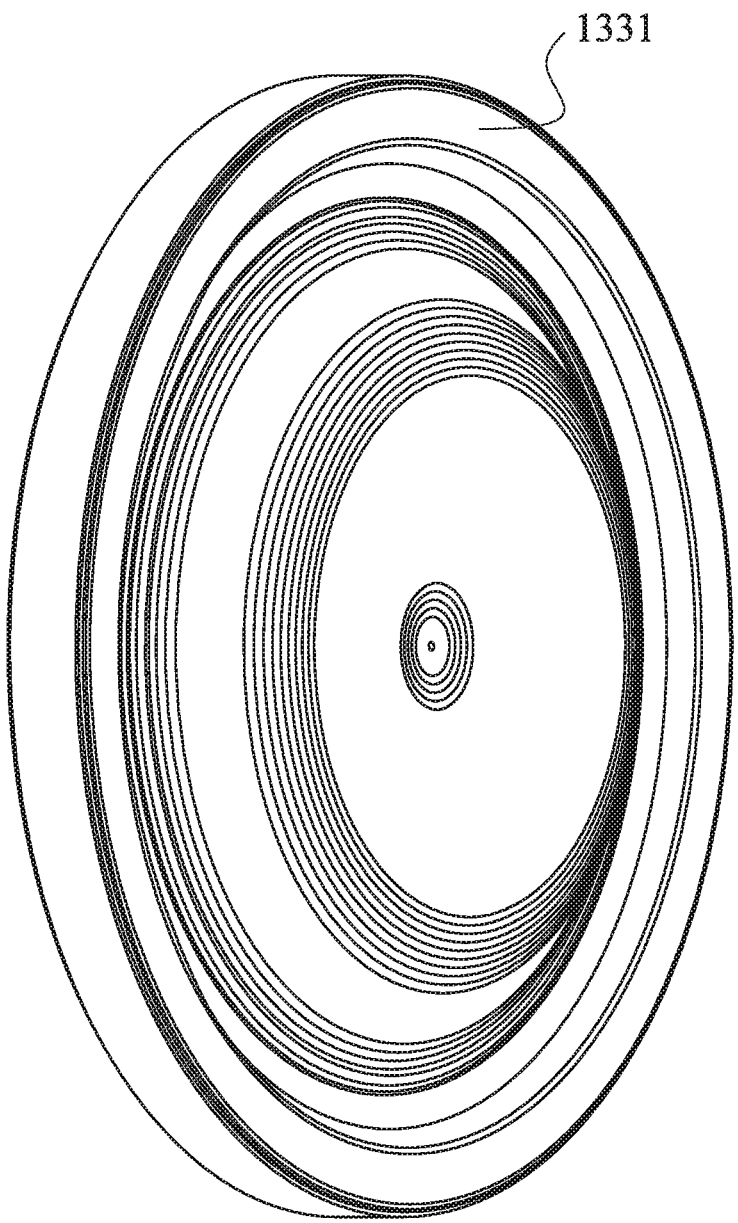
FIG. 1G is another three dimensional schematic view of the plastic lens element according to the 1st embodiment of FIG. 1A.
Figure 1H:
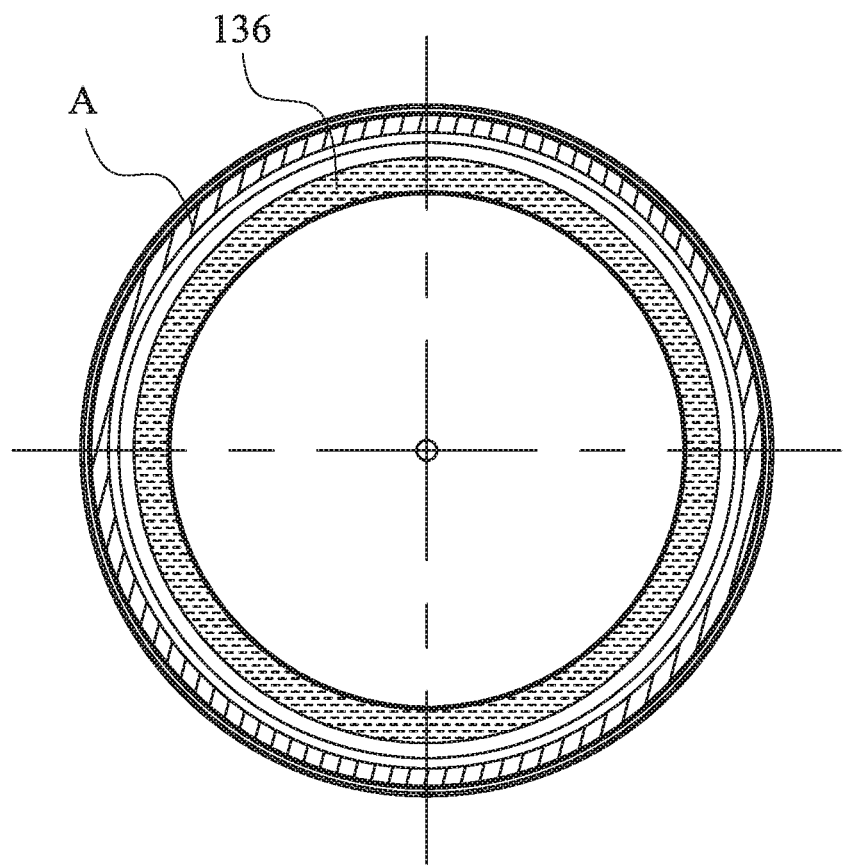
FIG. 1H is a schematic view showing one inspection situation of the plastic lens element according to the 1st embodiment of FIG. 1A.

FIG. 1F is a three dimensional schematic view of the plastic lens element 130 according to the 1st embodiment of FIG. 1A. FIG. 1G is another three dimensional schematic view of the plastic lens element 130 according to the 1st embodiment of FIG. 1A. FIG. 1H is a schematic view showing one inspection situation of the plastic lens element 130 according to the 1st embodiment of FIG. 1A. FIG. 1I is a schematic view showing another inspection situation of the plastic lens element 130 according to the 1st embodiment of FIG. 1A. As shown in FIGS. 1E-1G, a light L1 for inspecting images enters from the peripheral surface 132 and then is transmitted by total internal reflection from the second optical inspecting surface 1332 to the first optical inspecting surface 1331 and out of the first optical inspecting surface 1331. After that, the light L1 for inspecting images can be captured by an image detector so as to analyze inspection images. Observing from the first optical inspecting surface 1331 to the second optical inspecting surface 1332, a virtual image of the peripheral surface 132 can be observed and a medium in contact with the peripheral surface 132 can be seen directly. As shown in FIG. 1H, a portion A represents that the peripheral surface 132 and the adhesive 1053 being totally in contact can be observed. Therefore, it can be determined as a qualified assembling result. As shown in FIG. 1I, a portion A represents that the peripheral surface 132 and the adhesive 1053 being in contact can be observed while a portion B represents that the peripheral surface 132 and the adhesive 1053 being not in contact (that is, there is an air gap between the peripheral surface 132 of the plastic lens element 130 and the plastic lens barrel 101) can be observed. Therefore, it is determined as an adjustment-required and correction-required assembling result. Accordingly, it is favorable to inspect a coating status of the adhesive disposed between the peripheral surface 132 and the plastic lens barrel 101 so as to assess if there are situations of insufficient filling or uneven coating of the adhesive and to further make subsequent adjustments and corrections.

2nd Embodiment

Figure 2A:
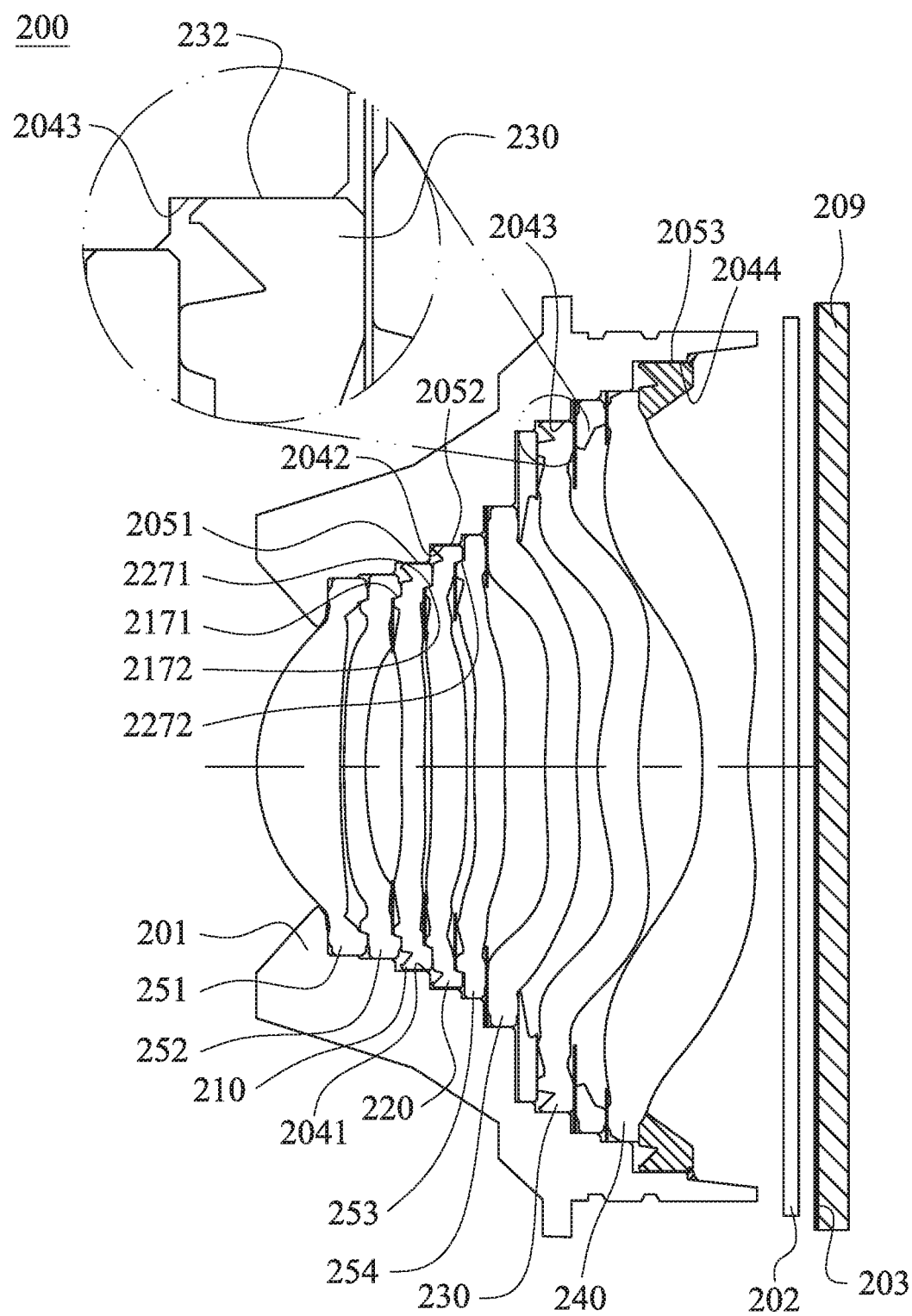
FIG. 2A is a schematic view of an imaging lens assembly according to the 2nd embodiment of the present disclosure.

FIG. 2A is a schematic view of an imaging lens assembly 200 according to the 2nd embodiment of the present disclosure. As shown in FIG. 2A, the imaging lens assembly 200 includes a plastic lens barrel 201 and an imaging lens set (its reference numeral is omitted). The imaging lens set is accommodated in the plastic lens barrel 201. Moreover, the imaging lens assembly 200 can further include a filter 202 disposed between the imaging lens set and an image surface 203.

The imaging lens set includes, in order from an object side to an image side, an imaging lens element 251, an imaging lens element 252, a plastic lens element 210, a plastic lens element 220, an imaging lens element 253, an imaging lens element 254, a plastic lens element 230 and a plastic lens element 240. Moreover, optical components such as a light blocking sheet, a spacer, or a retainer can be disposed depending on demand between the imaging lens element and the plastic lens element adjacent thereto in the imaging lens set, and reference numbers and explanation thereof will not be further provided.

Figure 2B:
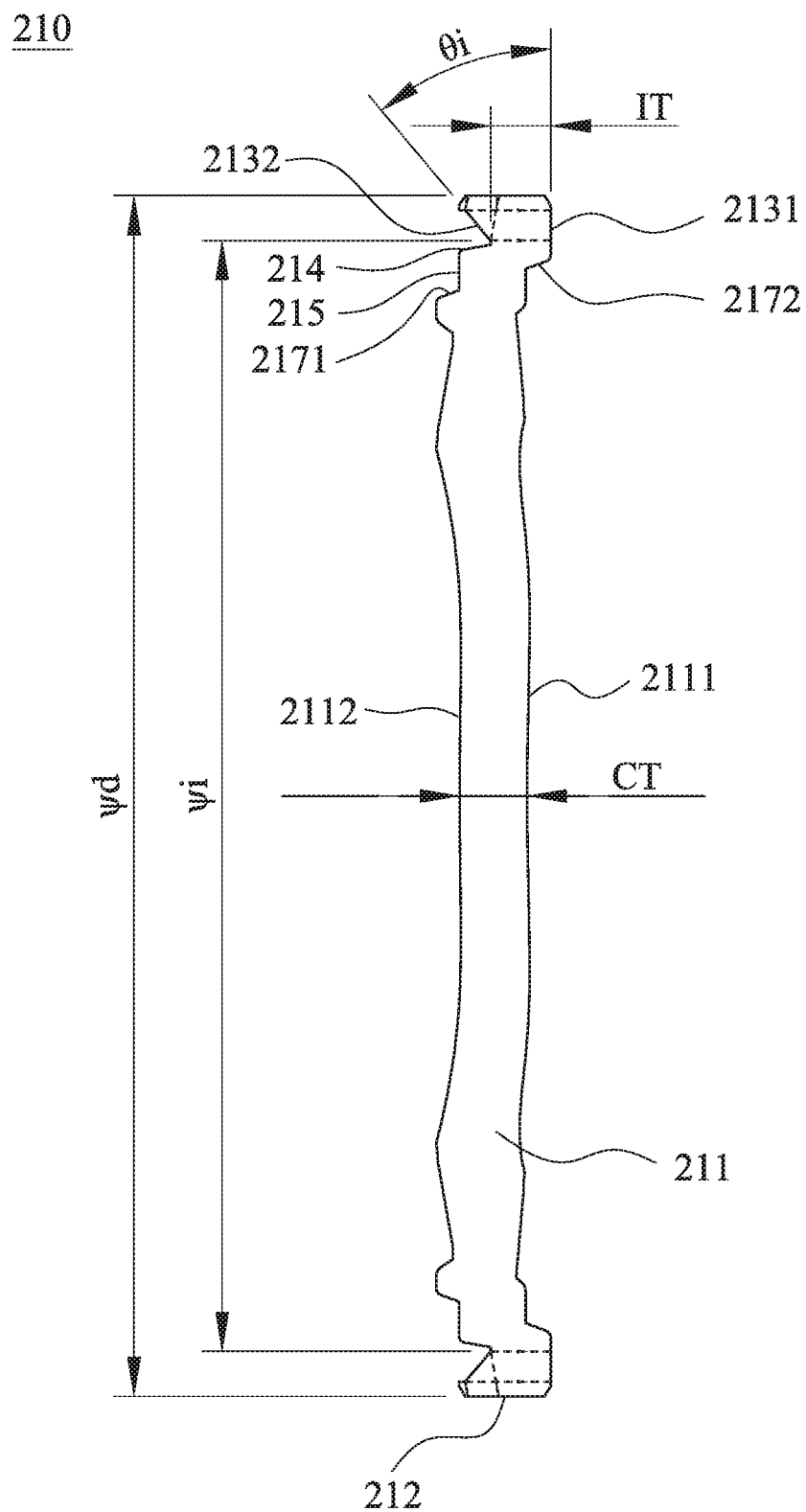
FIG. 2B is a schematic view of a plastic lens element according to the 2nd embodiment of FIG. 2A.

FIG. 2B is a schematic view of the plastic lens element 210 according to the 2nd embodiment of FIG. 2A. As shown in FIG. 2B, the plastic lens element 210 includes an optical effective portion 211 and a peripheral portion (its reference numeral is omitted). The peripheral portion surrounds the optical effective portion 211 and includes a peripheral surface 212, an optical inspecting structure (its reference numeral is omitted) and an annular auxiliary surface 214. The optical inspecting structure is disposed between the optical effective portion 211 and the peripheral surface 212. The optical inspecting structure includes a first optical inspecting surface 2131 and a second optical inspecting surface 2132, in which the first optical inspecting surface 2131 and the second optical inspecting surface 2132 are disposed on two sides of the peripheral portion respectively and correspond to each other. The annular auxiliary surface 214 and the second optical inspecting surface 2132 are disposed on the same side, and an annular groove is formed by the annular auxiliary surface 214 and the second optical inspecting surface 2132.

The optical effective portion 211 includes two surfaces being optical aspheric (that is, both of the object-side surface and the image-side surface are optical aspheric), and each of the two surfaces being optical aspheric includes at least one inflection point 2111, 2112. In the plastic lens element 210, the peripheral surface 212 is closer to the optical inspecting structure than the optical effective portion 211 to the optical inspecting structure. The first optical inspecting surface 2131 and the second optical inspecting surface 2132 are both smooth surfaces. Moreover, the peripheral portion can further include two receiving surfaces disposed on the two sides of the peripheral portion respectively and parallel to each other substantially. In detail, for the plastic lens element 210, one receiving surface is a receiving surface 215 and the other receiving surface is the first optical inspecting surface 2131.

As shown in FIG. 2B, the plastic lens element 210 satisfies the conditions listed in the following table. The definitions of parameters listed in the following table are the same as those described in the plastic lens element 110 with corresponding values for the plastic lens element 210, so explanation in this regard will not be provided again.

| The 2nd Embodiment - The plastic lens element 210 | | | |
|---|---|---|---|
| θi (degree) | 40 | θc (degree) | 36.4 |
| ψi (mm) | 5.268 | IT (mm) | 0.285 |
| ψd (mm) | 5.695 | CT (mm) | 0.32 |
| ψi/ψd | 0.925 | IT/CT | 0.89 |
| Nd | 1.686 | | |

Figure 2C:
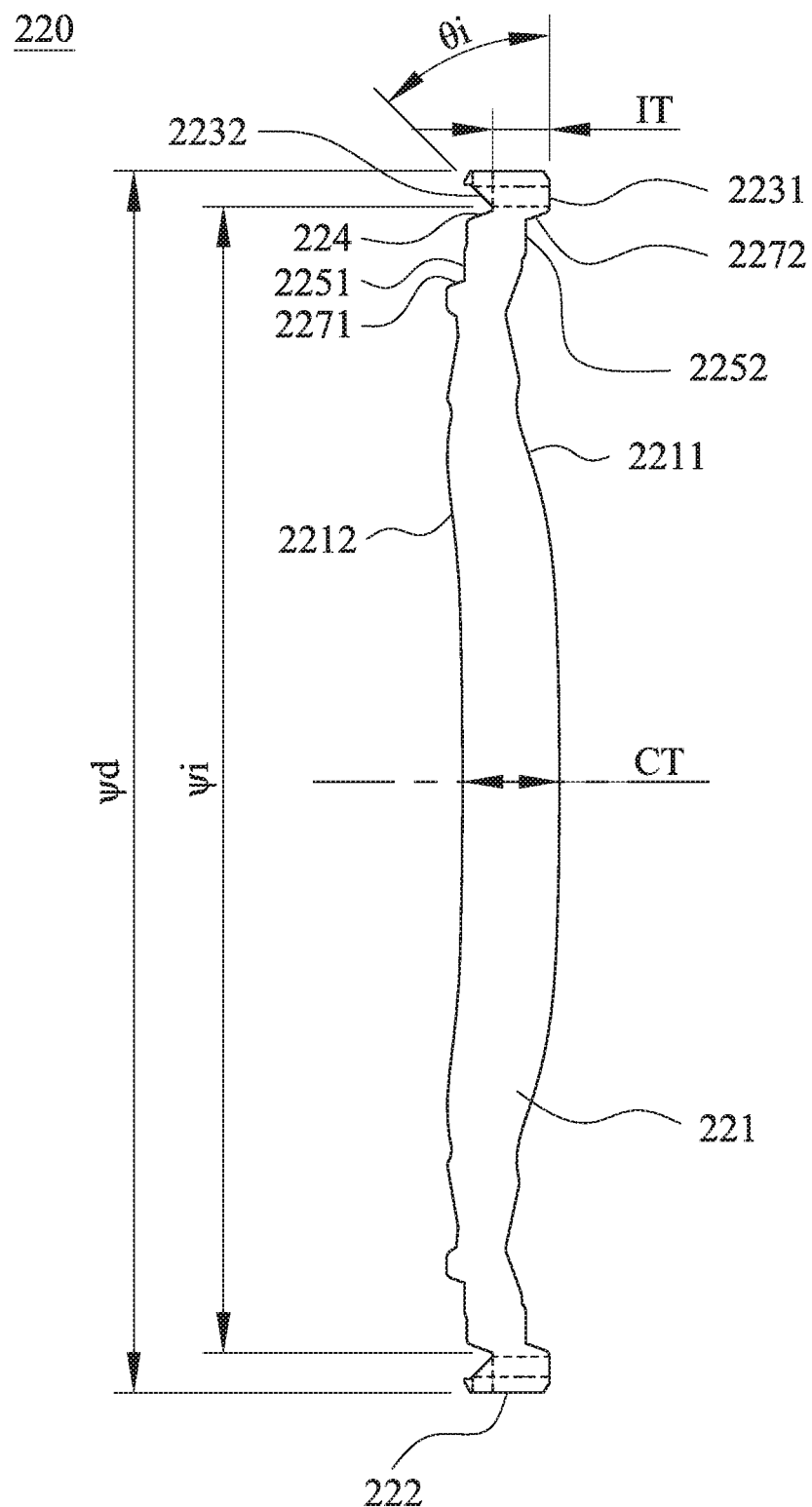
FIG. 2C is a schematic view of a plastic lens element according to the 2nd embodiment of FIG. 2A.

FIG. 2C is a schematic view of the plastic lens element 220 according to the 2nd embodiment of FIG. 2A. As shown in FIG. 2C, the plastic lens element 220 includes an optical effective portion 221 and a peripheral portion (its reference numeral is omitted). The peripheral portion surrounds the optical effective portion 221 and includes a peripheral surface 222, an optical inspecting structure (its reference numeral is omitted) and an annular auxiliary surface 224. The optical inspecting structure is disposed between the optical effective portion 221 and the peripheral surface 222. The optical inspecting structure includes a first optical inspecting surface 2231 and a second optical inspecting surface 2232, in which the first optical inspecting surface 2231 and the second optical inspecting surface 2232 are disposed on two sides of the peripheral portion respectively and correspond to each other. The annular auxiliary surface 224 and the second optical inspecting surface 2232 are disposed on the same side, and an annular groove is formed by the annular auxiliary surface 224 and the second optical inspecting surface 2232.

The optical effective portion 221 includes two surfaces being optical aspheric (that is, both of the object-side surface and the image-side surface are optical aspheric), and each of the two surfaces being optical aspheric includes at least one inflection point 2211, 2212. In the plastic lens element 220, the peripheral surface 222 is closer to the optical inspecting structure than the optical effective portion 221 to the optical inspecting structure. The first optical inspecting surface 2231 and the second optical inspecting surface 2232 are both smooth surfaces. Moreover, the peripheral portion can further include two receiving surfaces disposed on the two sides of the peripheral portion respectively and parallel to each other substantially. In detail, for the plastic lens element 220, one receiving surface is a receiving surface 2251 and the other receiving surface is a receiving surface 2252.

As shown in FIG. 2C, the plastic lens element 220 satisfies the conditions listed in the following table. The definitions of parameters listed in the following table are the same as those described in the plastic lens element 110 with corresponding values for the plastic lens element 220, so explanation in this regard will not be provided again.

| The 2nd Embodiment - The plastic lens element 220 | | | |
|---|---|---|---|
| θi (degree) | 45 | θc (degree) | 40.4 |
| ψi (mm) | 5.836 | IT (mm) | 0.288 |
| ψd (mm) | 6.2 | CT (mm) | 0.491 |
| ψi/ψd | 0.941 | IT/CT | 0.59 |
| Nd | 1.544 | | |

Figure 2D:
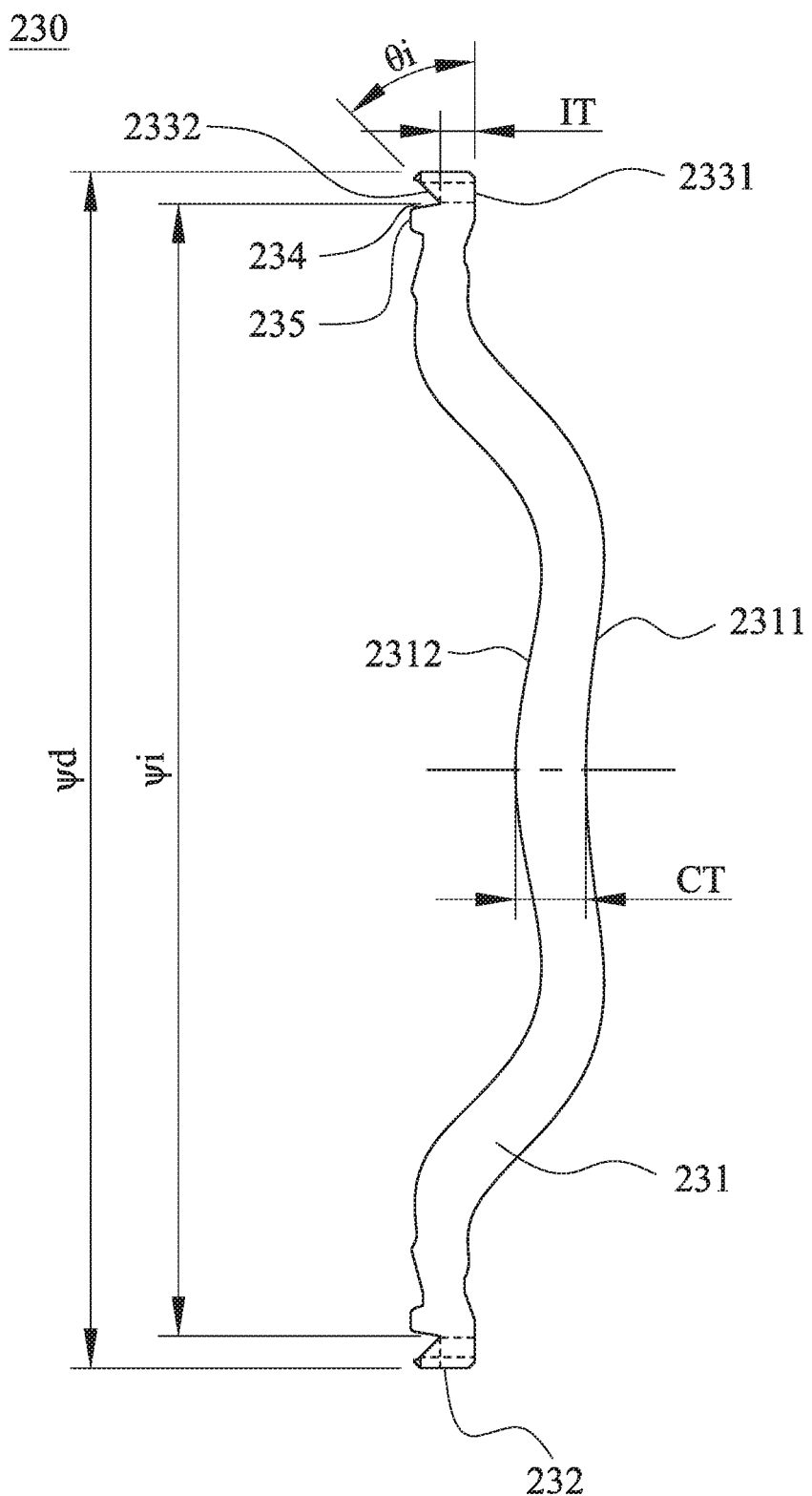
FIG. 2D is a schematic view of a plastic lens element according to the 2nd embodiment of FIG. 2A.

FIG. 2D is a schematic view of the plastic lens element 230 according to the 2nd embodiment of FIG. 2A. As shown in FIG. 2D, the plastic lens element 230 includes an optical effective portion 231 and a peripheral portion (its reference numeral is omitted). The peripheral portion surrounds the optical effective portion 231 and includes a peripheral surface 232, an optical inspecting structure (its reference numeral is omitted) and an annular auxiliary surface 234. The optical inspecting structure is disposed between the optical effective portion 231 and the peripheral surface 232. The optical inspecting structure includes a first optical inspecting surface 2331 and a second optical inspecting surface 2332, in which the first optical inspecting surface 2331 and the second optical inspecting surface 2332 are disposed on two sides of the peripheral portion respectively and correspond to each other. The annular auxiliary surface 234 and the second optical inspecting surface 2332 are disposed on the same side, and an annular groove is formed by the annular auxiliary surface 234 and the second optical inspecting surface 2332.

The optical effective portion 231 includes two surfaces being optical aspheric (that is, both of the object-side surface and the image-side surface are optical aspheric), and each of the two surfaces being optical aspheric includes at least one inflection point 2311, 2312. In the plastic lens element 230, the peripheral surface 232 is closer to the optical inspecting structure than the optical effective portion 231 to the optical inspecting structure. The first optical inspecting surface 2331 and the second optical inspecting surface 2332 are both smooth surfaces. Moreover, the peripheral portion can further include two receiving surfaces disposed on the two sides of the peripheral portion respectively and parallel to each other substantially. In detail, for the plastic lens element 230, one receiving surface is a receiving surface 235 and the other receiving surface is the first optical inspecting surface 2331.

As shown in FIG. 2D, the plastic lens element 230 satisfies the conditions listed in the following table. The definitions of parameters listed in the following table are the same as those described in the plastic lens element 110 with corresponding values for the plastic lens element 230, so explanation in this regard will not be provided again.

| The 2nd Embodiment - The plastic lens element 230 | | | |
|---|---|---|---|
| θi (degree) | 45 | θc (degree) | 40.4 |
| ψi (mm) | 9.19 | IT (mm) | 0.28 |
| ψd (mm) | 9.69 | CT (mm) | 0.57 |
| ψi/ψd | 0.948 | IT/CT | 0.49 |
| Nd | 1.544 | | |

Figure 2E:
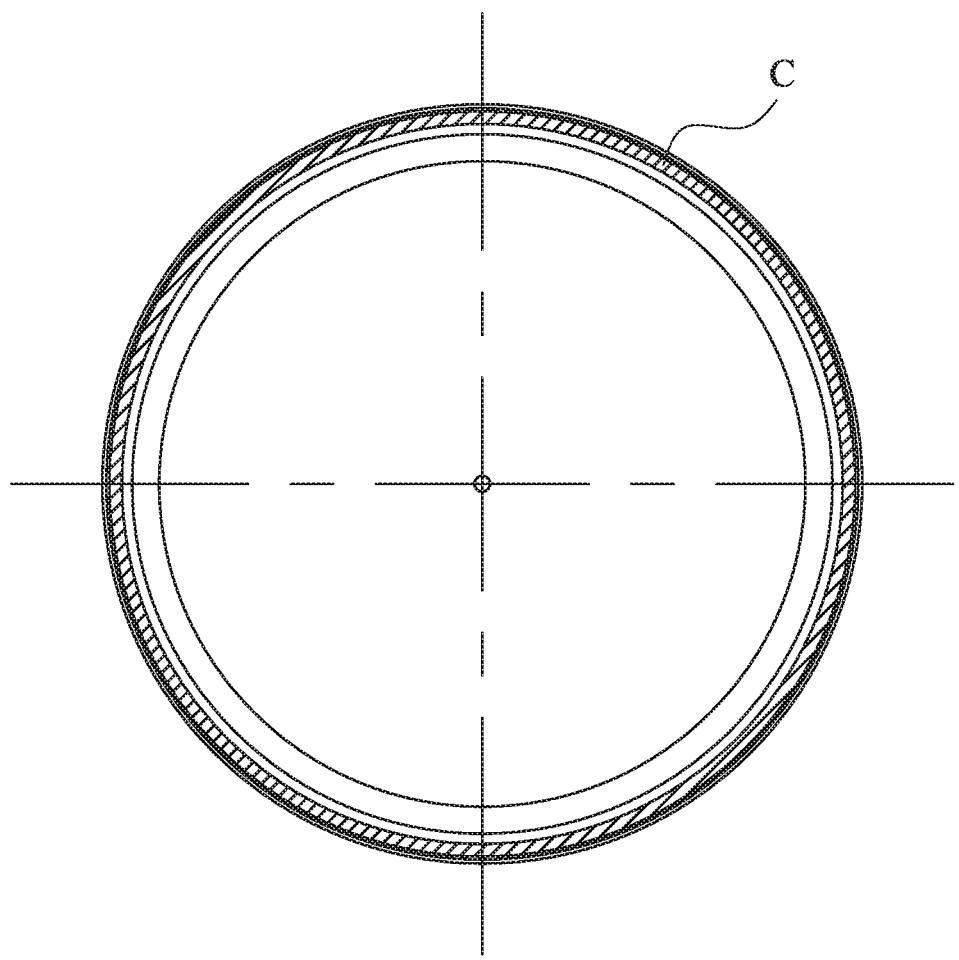
FIG. 2E is a schematic view showing one inspection situation of the plastic lens element according to the 2nd embodiment of FIG. 2A.
Figure 2F:
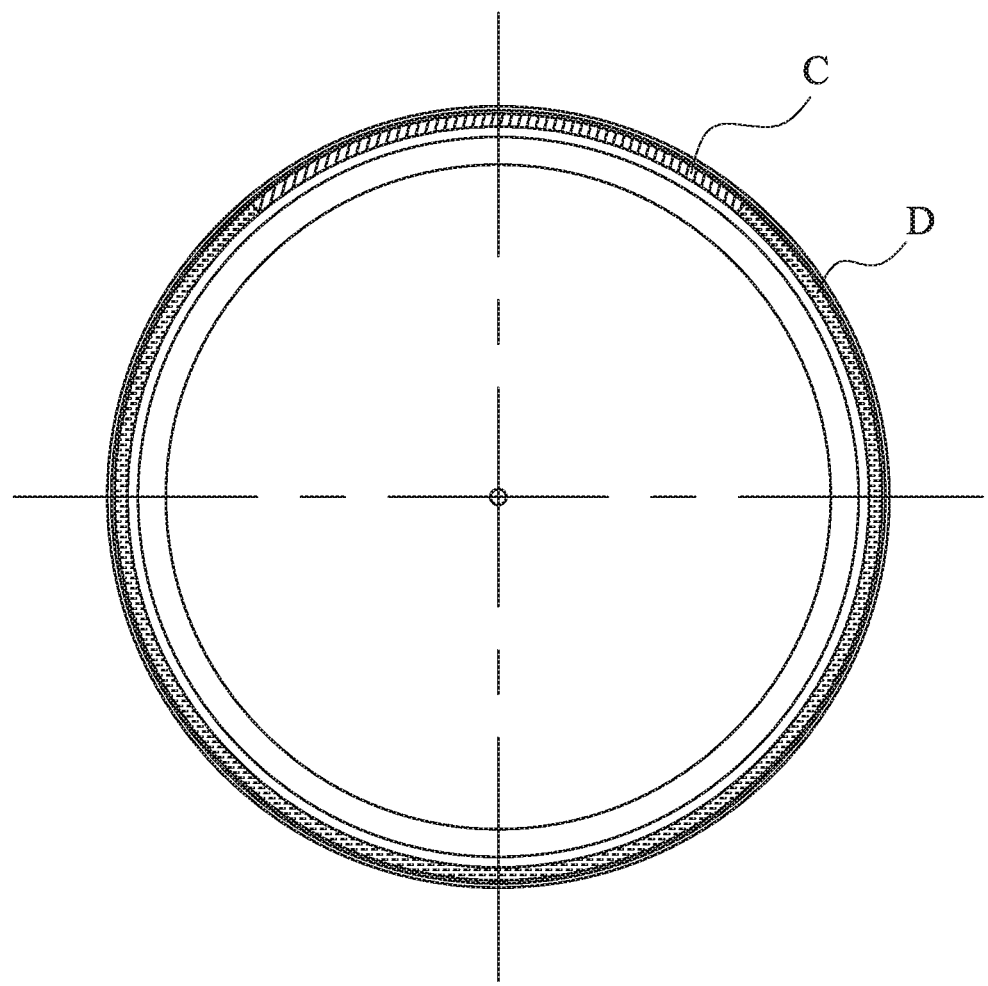
FIG. 2F is a schematic view showing another inspection situation of the plastic lens element according to the 2nd embodiment of FIG. 2A.

FIG. 2E is a schematic view showing one inspection situation of the plastic lens element 230 according to the 2nd embodiment of FIG. 2A. FIG. 2F is a schematic view showing another inspection situation of the plastic lens element 230 according to the 2nd embodiment of FIG. 2A. Please refer to FIG. 2A, the plastic lens barrel 201 has a parallel inner annular surface 2041, a parallel inner annular surface 2042, a parallel inner annular surface 2043 and a parallel inner annular surface 2044, in which the peripheral surface 232 of the plastic lens element 230 and the parallel inner annular surface 2043 of the plastic lens barrel 201 are correspondingly connected to each other. As shown in FIG. 2E, a portion C represents that the peripheral surface 232 and the parallel inner annular surface 2043 of the plastic lens barrel 201 being correspondingly connected entirely can be observed. Therefore, it is determined as a qualified assembling result. As shown in FIG. 2F, a portion C represents that the peripheral surface 232 and the parallel inner annular surface 2043 of the plastic lens barrel 201 being correspondingly connected can be observed while a portion D represents an area where the peripheral surface 232 and the parallel inner annular surface 2043 of the plastic lens barrel 201 is not correspondingly connected. Therefore, it is determined as an adjustment-required and correction-required assembling result. Accordingly, inspecting a connect status of the peripheral surface 232 and the parallel inner annular surface 2043 of the plastic lens barrel 201 so as to assess if the plastic lens element 230 is tilt and to further make subsequent adjustments and corrections.

Figure 2G:
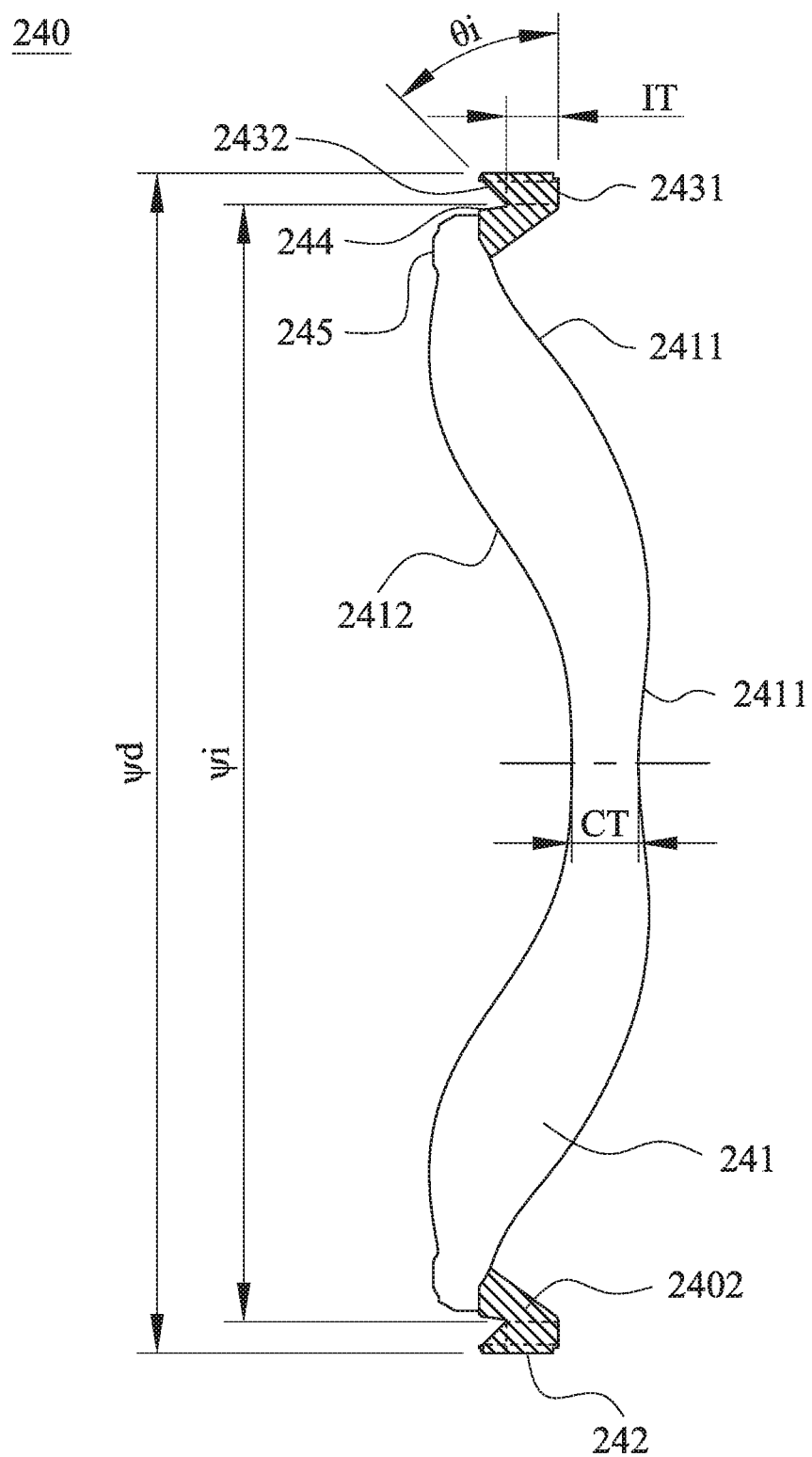
FIG. 2G is a schematic view of a plastic lens element according to the 2nd embodiment of FIG. 2A.

FIG. 2G is a schematic view of the plastic lens element 240 according to the 2nd embodiment of FIG. 2A. As shown in FIG. 2G, the plastic lens element 240 includes an optical effective portion 241 and a peripheral portion (its reference numeral is omitted). The peripheral portion surrounds the optical effective portion 241 and includes a peripheral surface 242, an optical inspecting structure (its reference numeral is omitted) and an annular auxiliary surface 244. The optical inspecting structure is disposed between the optical effective portion 241 and the peripheral surface 242. The optical inspecting structure includes a first optical inspecting surface 2431 and a second optical inspecting surface 2432, in which the first optical inspecting surface 2431 and the second optical inspecting surface 2432 are disposed on two sides of the peripheral portion respectively and correspond to each other. The annular auxiliary surface 244 and the second optical inspecting surface 2432 are disposed on the same side, and an annular groove is formed by the annular auxiliary surface 244 and the second optical inspecting surface 2432.

The optical effective portion 241 includes two surfaces being optical aspheric (that is, both of the object-side surface and the image-side surface are optical aspheric), and each of the two surfaces being optical aspheric includes at least one inflection point 2411, 2412. In the plastic lens element 240, the peripheral surface 242 is closer to the optical inspecting structure than the optical effective portion 241 to the optical inspecting structure. The first optical inspecting surface 2431 and the second optical inspecting surface 2432 are both smooth surfaces. Moreover, the peripheral portion can further include a receiving surface 245 disposed on the object side of the peripheral portion. Furthermore, the plastic lens element 240 is a dual molded lens element formed integrally of a transparent portion (its reference numeral is omitted) and a black portion 2402. In detail, the transparent portion is the optical effective portion 241 and one portion of the peripheral portion while the black portion 2402 is the other portion of the peripheral portion but it is not limited thereto.

As shown in FIG. 2G, the plastic lens element 240 satisfies the conditions listed in the following table. The definitions of parameters listed in the following table are the same as those described in the plastic lens element 110 with corresponding values for the plastic lens element 240, so explanation in this regard will not be provided again.

| The 2nd Embodiment - The plastic lens element 240 | | | |
|---|---|---|---|
| θi (degree) | 45 | θc (degree) | 37.6 |
| ψi (mm) | 10.74 | IT (mm) | 0.5 |
| ψd (mm) | 11.34 | CT (mm) | 0.641 |
| ψi/ψd | 0.947 | IT/CT | 0.78 |
| Nd | 1.640 | | |

Please refer to FIGS. 2A-2C, the peripheral portion of the plastic lens element 210 can further include two axial aligning structures 2171, 2172, which are located on the object side and the image side of the plastic lens element 210, respectively. The peripheral portion of the plastic lens element 220 can further include an axial aligning structure 2271 and an axial aligning structure 2272 located on the object side and the image side of the plastic lens element 220 respectively. The axial aligning structure 2171 is for coaxially disposing the plastic lens element 210 and the imaging lens element 252 adjacent to the plastic lens element 210. The axial aligning structure 2172 is for coaxially disposing the plastic lens element 210 and an imaging lens element (that is, the plastic lens element 220) adjacent to the plastic lens element 210. Specifically, the axial aligning structure 2172 connects the axial aligning structure 2271 of the plastic lens element 220. The axial aligning structure 2272 is for coaxially disposing the plastic lens element 220 and the imaging lens element 253 adjacent to the plastic lens element 220.

As shown in FIGS. 2A-2C and FIG. 2G, a gap (its reference numeral is omitted) is formed between each of the peripheral surfaces 212, 222, 242 of the plastic lens elements 210, 220, 240 and each of the parallel inner annular surfaces 2041, 2042, 2044 of the plastic lens barrel 201, respectively. The imaging lens assembly 200 can further include adhesives 2051, 2052, 2053 disposed in the gaps, respectively. The adhesives 2051, 2052, 2053 are for bonding the plastic lens elements 210, 220, 240 and the plastic lens barrel 201, respectively.

Figure 2H:
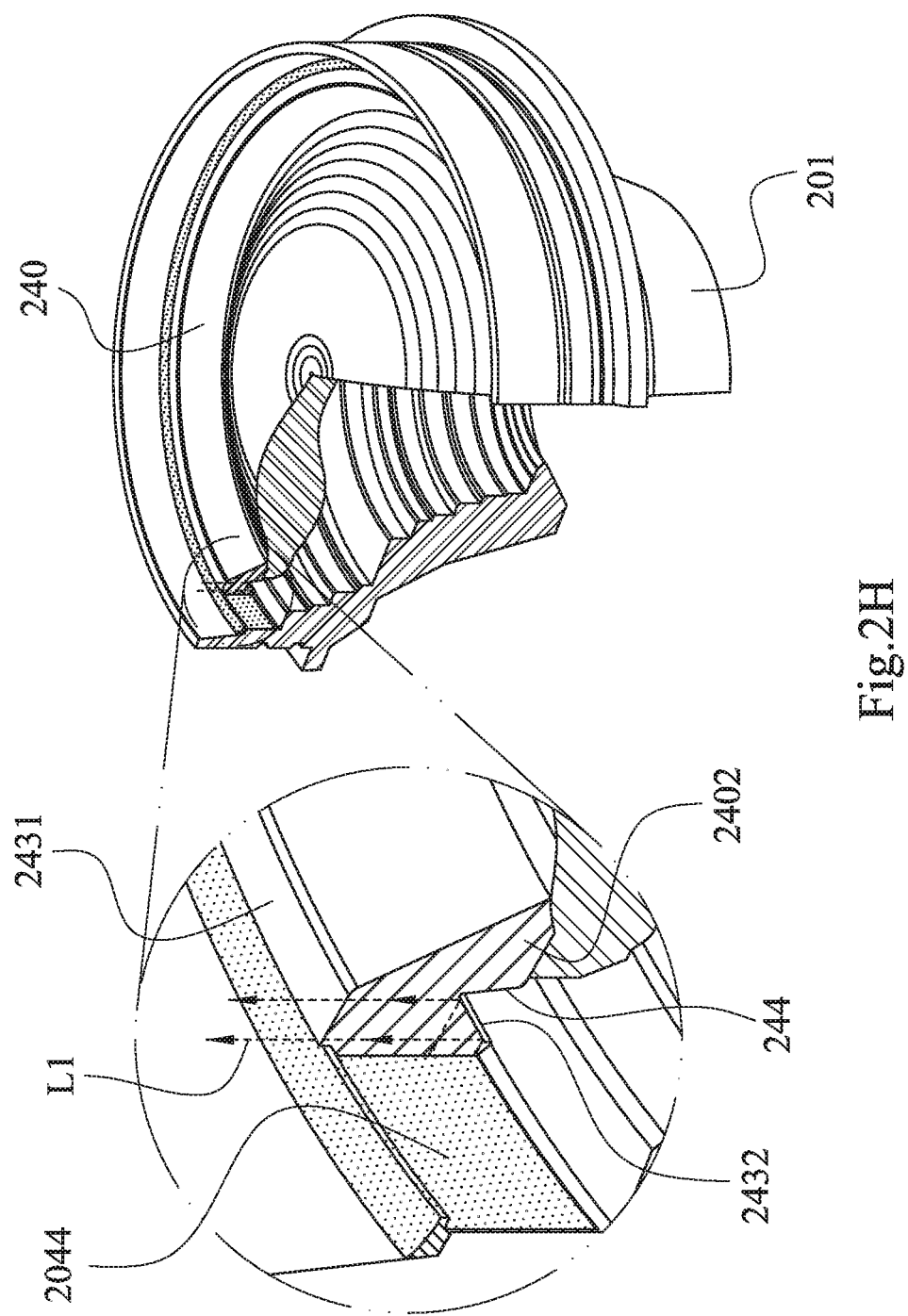
FIG. 2H is a partial cross-sectional view of a plastic lens barrel and the plastic lens element according to the 2nd embodiment of FIG. 2A.
Figure 2I:
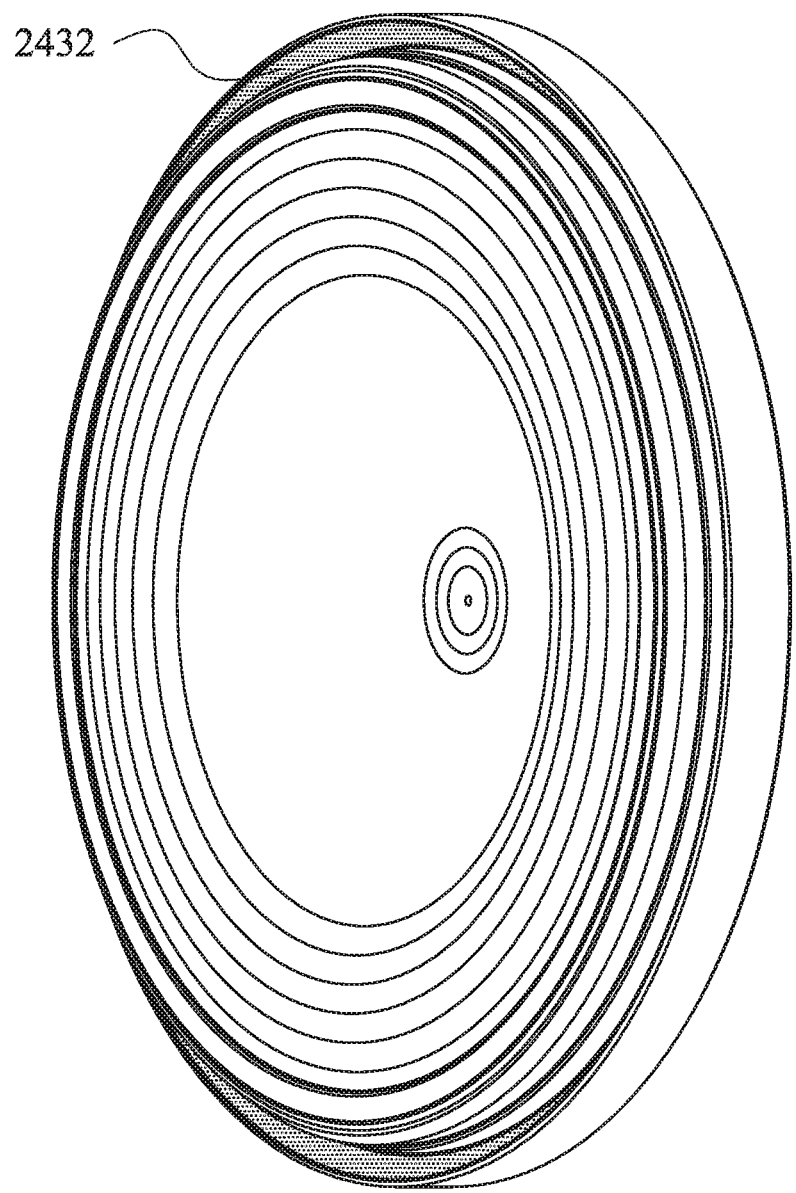
FIG. 2I is a three dimensional schematic view of the plastic lens element according to the 2nd embodiment of FIG. 2A.
Figure 2J:
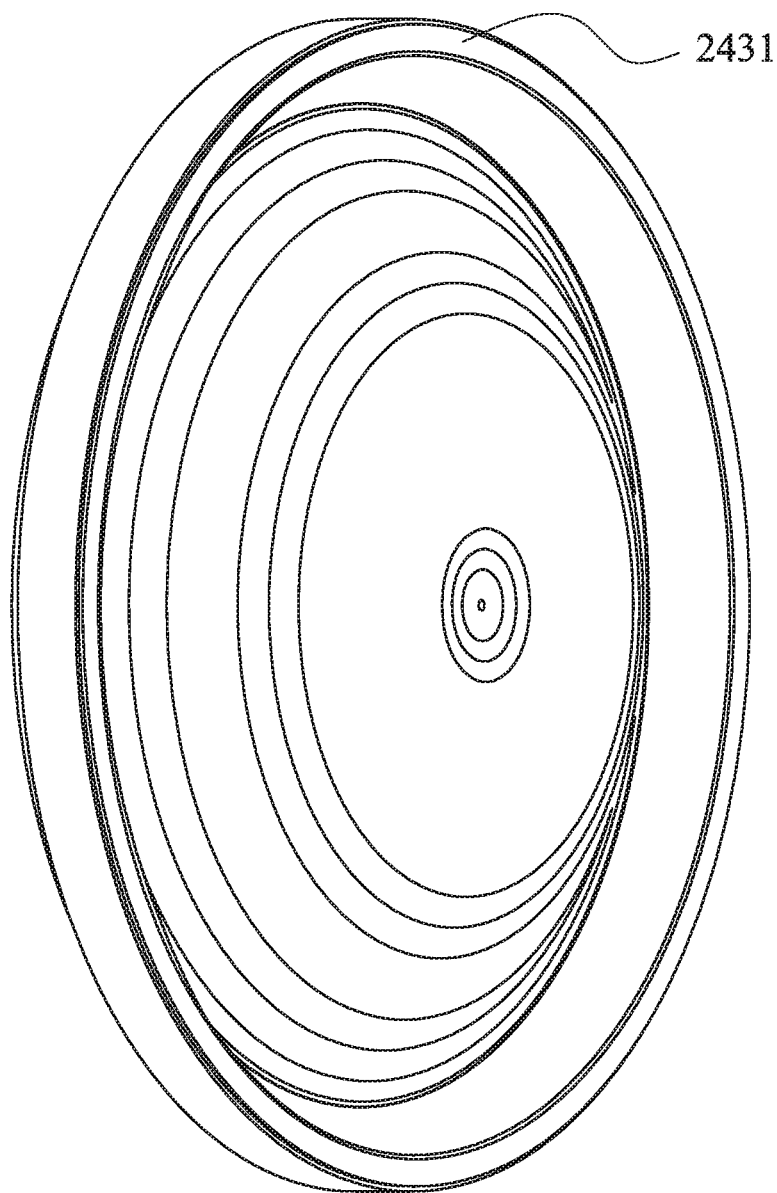
FIG. 2J is another three dimensional schematic view of the plastic lens element according to the 2nd embodiment of FIG. 2A.
Figure 2K:
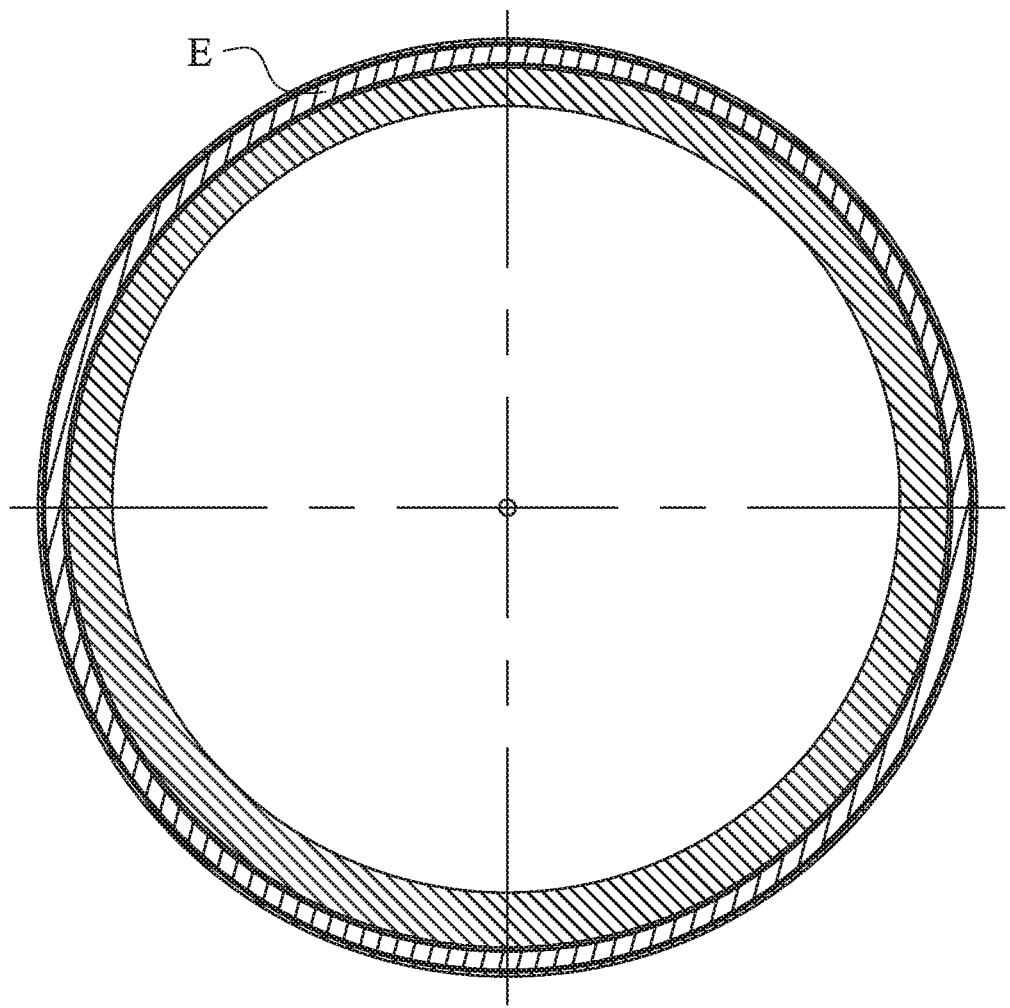
FIG. 2K is a schematic view showing one inspection situation of the plastic lens element according to the 2nd embodiment of FIG. 2A.
Figure 2L:
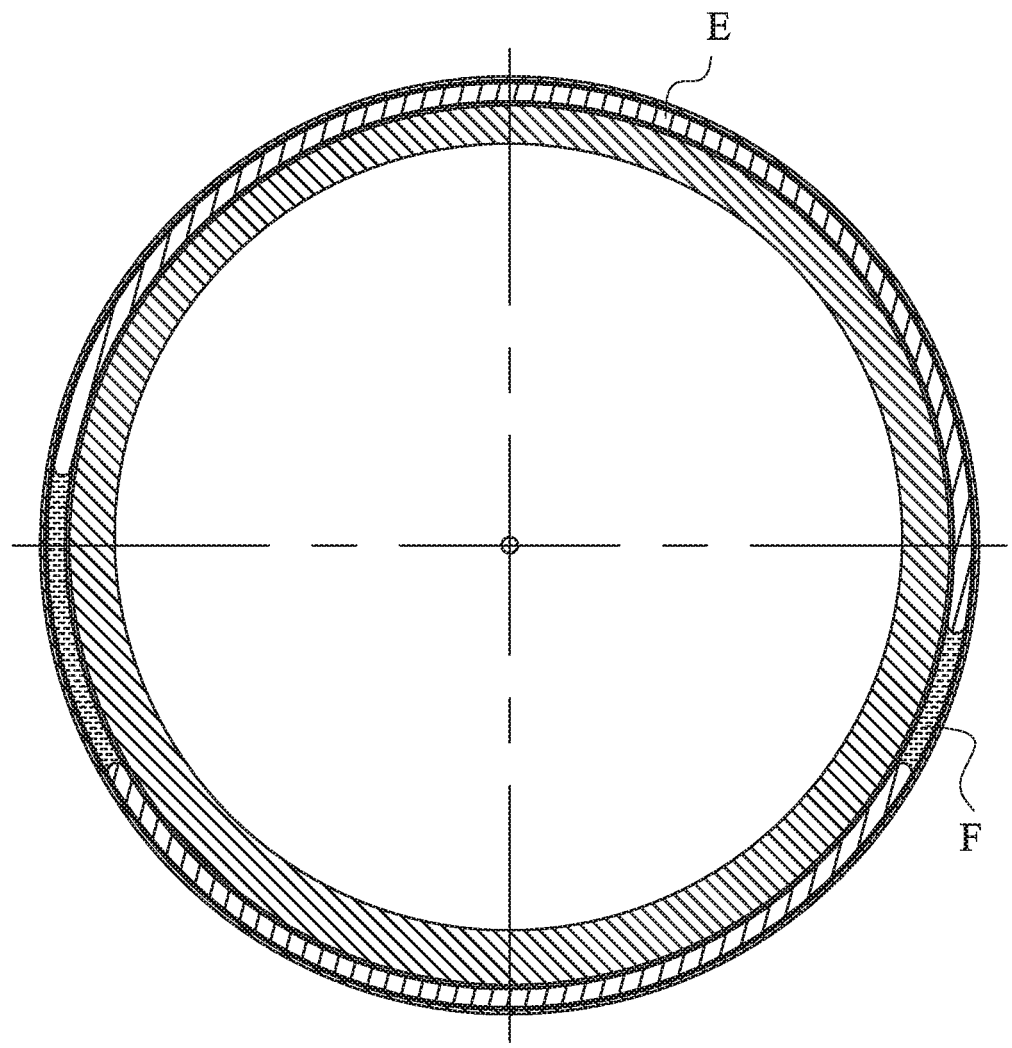
FIG. 2L is a schematic view showing another inspection situation of the plastic lens element according to the 2nd embodiment of FIG. 2A.

FIG. 2H is a partial cross-sectional view of the plastic lens barrel 201 and the plastic lens element 240 according to the 2nd embodiment of FIG. 2A. FIG. 2I is a three dimensional schematic view of the plastic lens element 240 according to the 2nd embodiment of FIG. 2A. FIG. 2J is another three dimensional schematic view of the plastic lens element 240 according to the 2nd embodiment of FIG. 2A. FIG. 2K is a schematic view showing one inspection situation of the plastic lens element 240 according to the 2nd embodiment of FIG. 2A. FIG. 2L is a schematic view showing another inspection situation of the plastic lens element 240 according to the 2nd embodiment of FIG. 2A. As shown in FIGS. 2G-2L, the plastic lens element 240 is the dual molded lens element and the optical inspecting structure is disposed on the black portion 2402. The light L1 for inspecting images can be an infrared light because the black portion 2402 can be penetrated by the infrared light. As shown in FIG. 2K, a portion E represents that the peripheral surface 242 and the adhesive 2053 being totally in contact can be observed. Therefore, it is determined as a qualified assembling result. As shown in FIG. 2L, a portion E represents that the peripheral surface 242 and the adhesive 2053 being in contact can be observed while a portion F represents that the peripheral surface 242 and the adhesive 2053 being not in contact (that is, there is an air gap between the peripheral surface 242 of the plastic lens element 240 and the plastic lens barrel 201) can be observed. Therefore, it is determined as an adjustment-required and correction-required assembling result.

3rd Embodiment

Figure 3A:
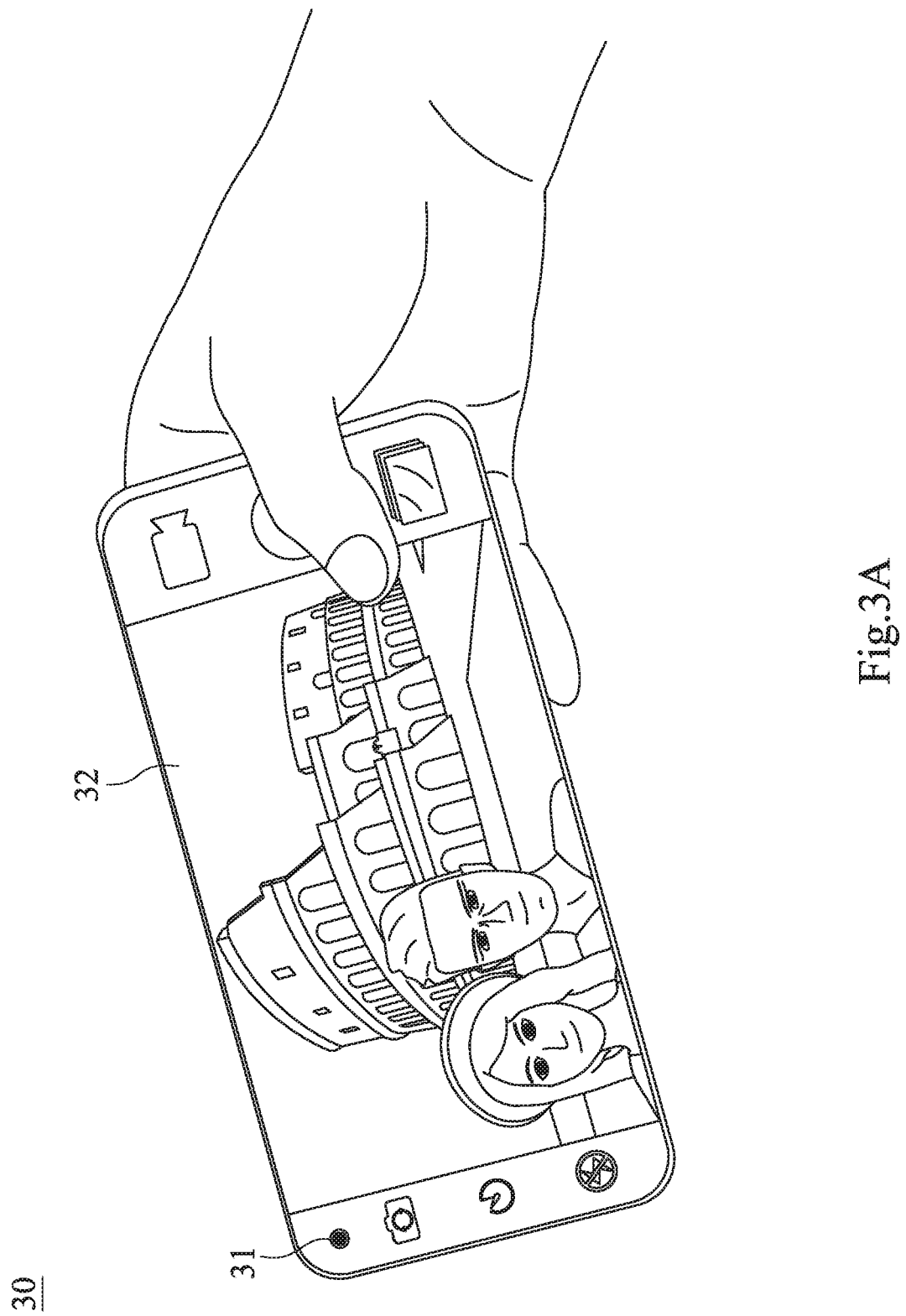
FIG. 3A is a schematic view of an electronic device according to the 3rd embodiment of the present disclosure.
Figure 3B:
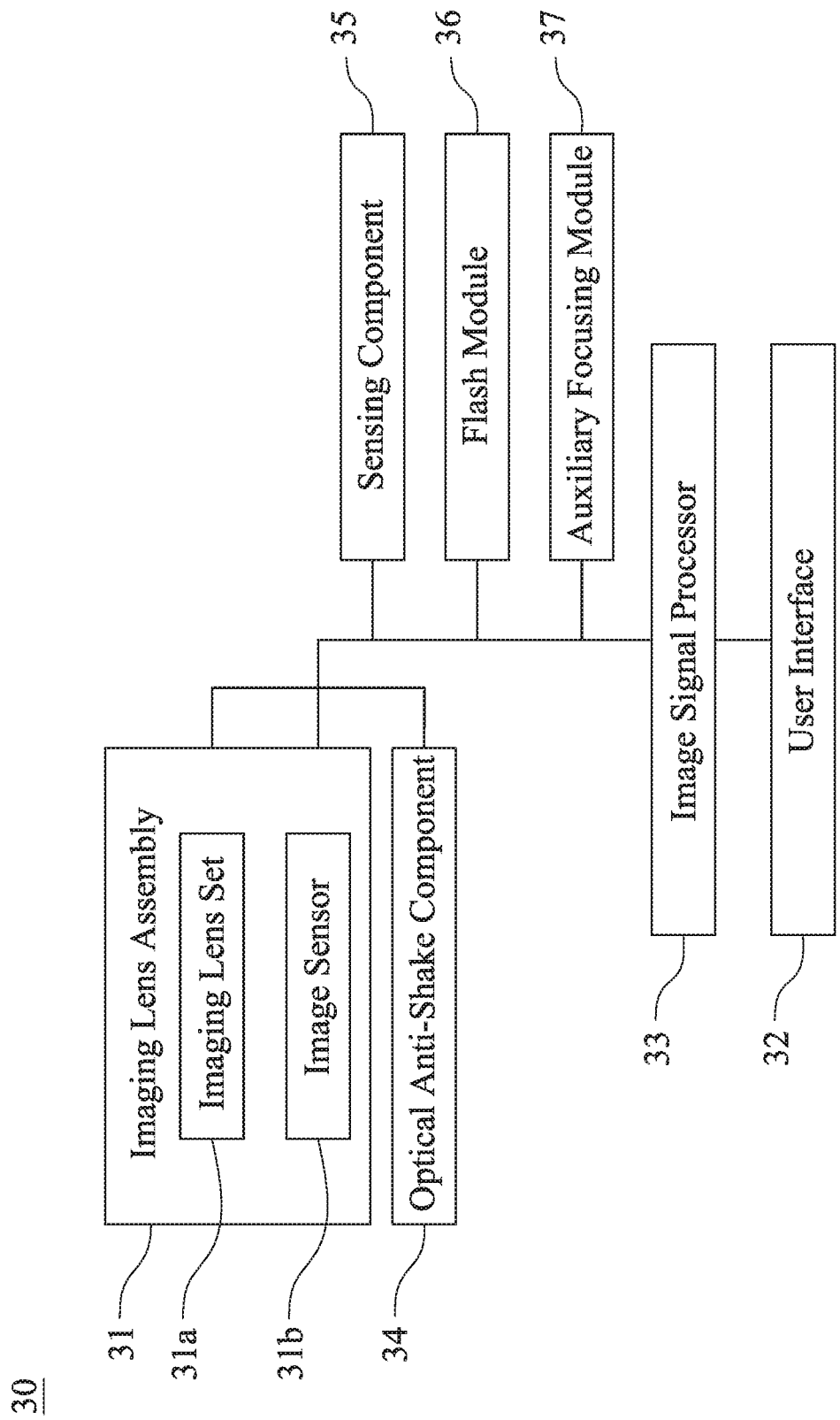
FIG. 3B is a block diagram of the electronic device according to the 3rd embodiment of FIG. 3A.

FIG. 3A is a schematic view of an electronic device 30 according to the 3rd embodiment of the present disclosure. FIG. 3B is a block diagram of the electronic device 30 according to the 3rd embodiment of FIG. 3A. As shown in FIGS. 3A-3B, the electronic device 30 is a smart phone and includes an imaging lens assembly 31. The imaging lens assembly 31 includes an imaging lens set 31a, an image sensor 31b and a plastic lens element (not shown). The imaging lens assembly 31 according to the 3rd embodiment is disposed on an area at the side of a user interface 32, and the image sensor 31b is disposed on an image surface (not shown) of the imaging lens assembly 31. The user interface 32 can be a touch screen or a display screen, but it is not limited thereto. The imaging lens assembly 31 can be any one of the aforementioned 1st embodiment and the aforementioned 2nd embodiment, but the present disclosure is not limited thereto.

Specifically, a user activates a shooting mode by the user interface 32 of the electronic device 30; at this moment, the imaging lens assembly 31 collects an imaging light on the image sensor 31b and outputs an electronic signal about an image to an Image Signal Processor (ISP) 33.

In response to camera specifications of the electronic device 30, the electronic device 30 can further include an optical anti-shake component 34 which can be an OIS (Optical Image Stabilizer) anti-shake feedback device. Furthermore, the electronic device 30 can further include at least one auxiliary optical component (its reference numeral is omitted) and at least one sensing component 35. In the 3rd embodiment, the at least one auxiliary optical component are a flash module 36 and an auxiliary focusing module 37. The flash module 36 can be used for compensating for color temperature and the auxiliary focusing module 37 can be an infrared ranging component, a laser focusing module, etc. The at least one sensing component 35 can have a function of sensing physical momentum and actuation energy, such as an accelerometer, a gyroscope, and a Hall Effect Element to sense the shaking by the user's hand or the external environment. As a result, an autofocus function and the optical anti-shake component 34 configured by the imaging lens assembly 31 in the electronic device 30 are favorable to show their abilities so as to achieve good imaging quality and to facilitate multiple modes of shooting functions being provided by the electronic device 30 according to the present disclosure, such as optimized self-timer, low light source HDR (High Dynamic Range imaging), high resolution 4K (4K Resolution) video. Moreover, the user can directly watch a shooting image of a camera from the touch screen and manually operate a viewing range on the touch screen to achieve the autofocus function of what you see is what you get.

Furthermore, the electronic device 30 can further include, but is not limited to, a display unit, a control unit, a storage unit, a Random Access Memory (RAM), a Read-Only Memory (ROM), or a combination thereof.

Figure 3C:
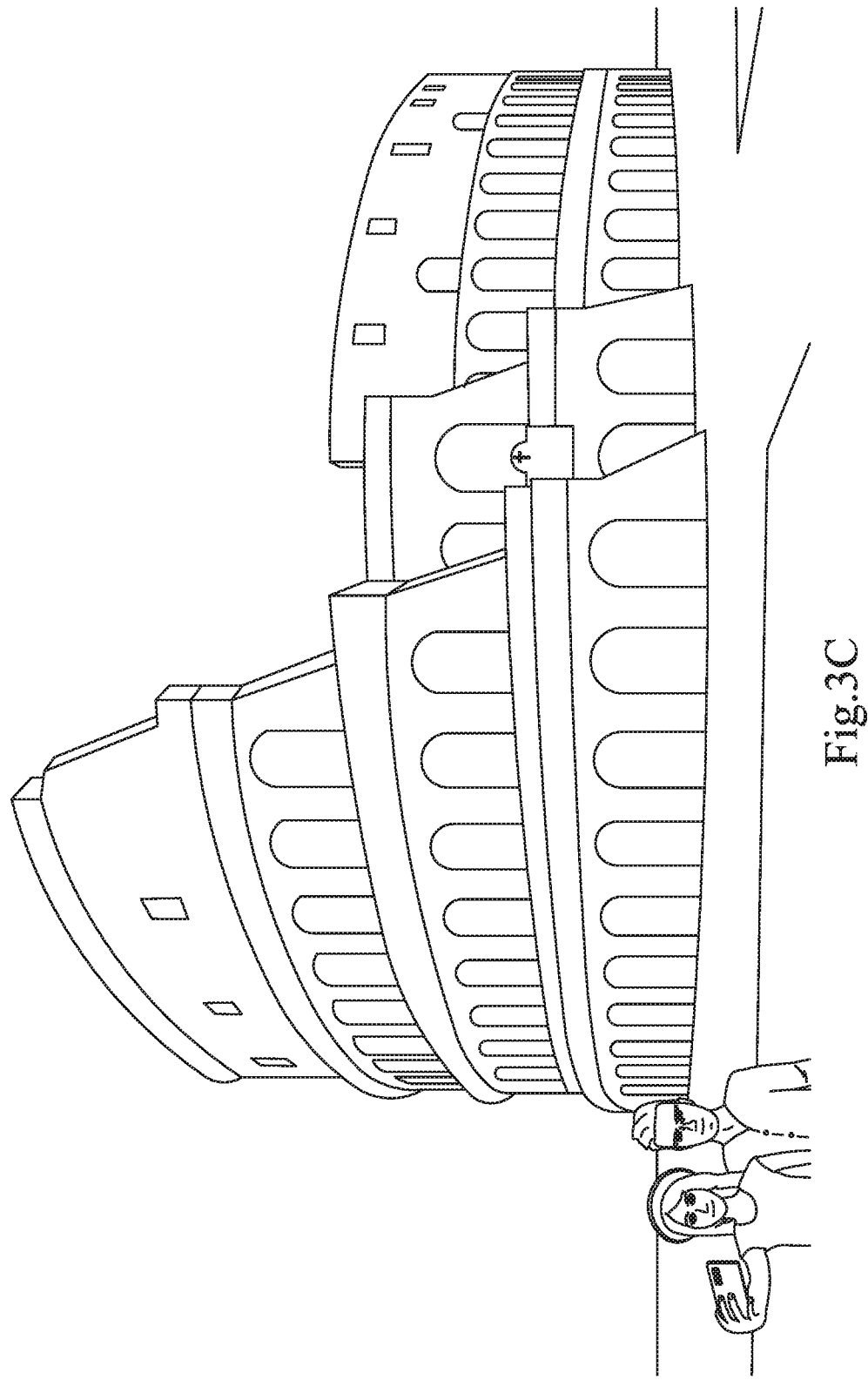
FIG. 3C is a schematic view of a selfie scenario according to the 3rd embodiment of FIG. 3A.
Figure 3D:
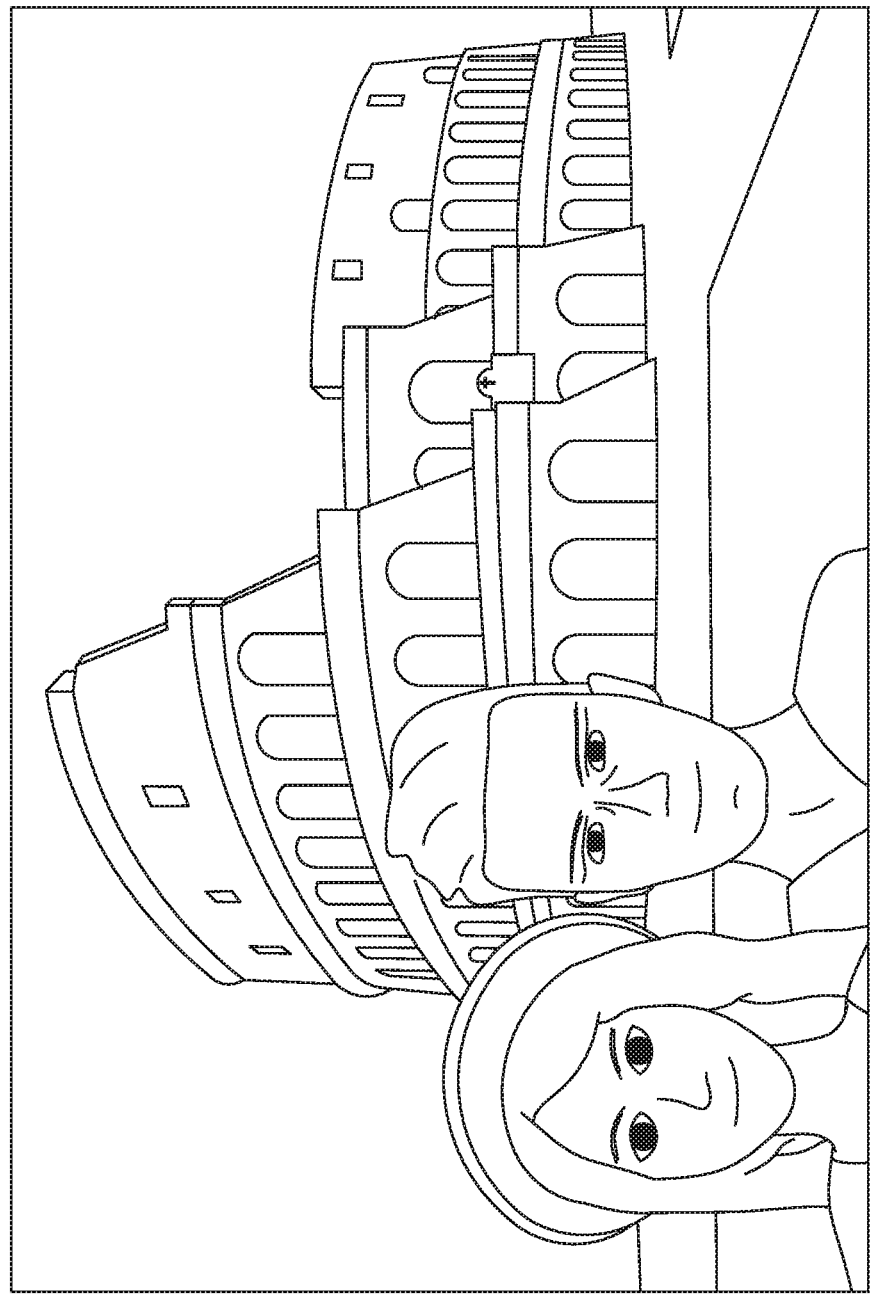
FIG. 3D is a schematic view of a selfie image according to the 3rd embodiment of FIG. 3A.

FIG. 3C is a schematic view of a selfie scenario according to the 3rd embodiment of FIG. 3A. FIG. 3D is a schematic view of a selfie image according to the 3rd embodiment of FIG. 3A. As shown in FIGS. 3A-3D, the imaging lens assembly 31 and the user interface 32 are towards the user. When taking a selfie or live streaming, the user can watch shooting images and operate the user interface at the same time, then an image shot as FIG. 3D can be obtained. Therefore, the imaging lens assembly 31 of the present disclosure can provide a better shooting experience.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A plastic lens element, comprising:
   an optical effective portion; and
   a peripheral portion surrounding the optical effective portion and comprising:
      a peripheral surface; and
      an optical inspecting structure disposed between the optical effective portion and the peripheral surface and comprising:
         a first optical inspecting surface; and
         a second optical inspecting surface, wherein the first optical inspecting surface and the second optical inspecting surface are disposed on two sides of the peripheral portion respectively and correspond to each other;
   wherein an angle between the first optical inspecting surface and the second optical inspecting surface is θi, a minimum thickness between the first optical inspecting surface and the second optical inspecting surface is IT, a central thickness of the plastic lens element is CT, and the following conditions are satisfied:

30 degrees≤θi<60 degrees; and 0.2<IT/CT<1.4.

2. The plastic lens element of claim 1, wherein a minimum diameter of the second optical inspecting surface is Ψi, a maximum diameter of the peripheral surface is Ψd, and the following condition is satisfied:

0.80<Ψi/Ψd<0.99.

3. The plastic lens element of claim 2, wherein the minimum diameter of the second optical inspecting surface is Ψi, the maximum diameter of the peripheral surface is Ψd, and the following condition is satisfied:

0.85≤Ψi/Ψd≤0.96.

4. The plastic lens element of claim 1, wherein the optical effective portion comprises at least one surface being optical aspheric.

5. The plastic lens element of claim 4, wherein the at least one surface being optical aspheric comprises at least one inflection point.

6. The plastic lens element of claim 1, wherein the peripheral portion further comprises an annular auxiliary surface, the annular auxiliary surface and the second optical inspecting surface are disposed on the same side, and an annular groove is formed by the annular auxiliary surface and the second optical inspecting surface.

7. The plastic lens element of claim 1, wherein the peripheral surface is closer to the optical inspecting structure than the optical effective portion to the optical inspecting structure.

8. The plastic lens element of claim 7, further comprising:
a light absorbing layer disposed on at least one of the two sides of the peripheral portion and located between the optical effective portion and the optical inspecting structure.

9. The plastic lens element of claim 1, wherein the angle between the first optical inspecting surface and the second optical inspecting surface is θi, a critical angle of total internal reflection of the plastic lens element is θc, and the following condition is satisfied:

θi>θc.

10. The plastic lens element of claim 1, wherein a refractive index of the plastic lens element is Nd, and the following condition is satisfied:

1.50<Nd<1.75.

11. The plastic lens element of claim 1, wherein the angle between the first optical inspecting surface and the second optical inspecting surface is θi, and the following condition is satisfied:

35 degrees≤θi≤55 degrees.

12. The plastic lens element of claim 1, wherein the plastic lens element is a dual molded lens element formed integrally of a transparent portion and a black portion.

13. The plastic lens element of claim 1, wherein the first optical inspecting surface and the second optical inspecting surface are both smooth surfaces.

14. The plastic lens element of claim 1, wherein a minimum thickness between the first optical inspecting surface and the second optical inspecting surface is IT, and the following condition is satisfied:

0.1 mm<IT<0.6 mm.

15. The plastic lens element of claim 1, wherein the minimum thickness between the first optical inspecting surface and the second optical inspecting surface is IT, the central thickness of the plastic lens element is CT, and the following condition is satisfied:

0.3—<IT/CT≤1.2.

16. An imaging lens assembly, comprising:
a plastic lens barrel; and
an imaging lens set accommodated in the plastic lens barrel and comprising at least one plastic lens element of claim 1.

17. The imaging lens assembly of claim 16, wherein the peripheral portion further comprises two receiving surfaces disposed on the two sides of the peripheral portion respectively and parallel to each other substantially.

18. The imaging lens assembly of claim 17, wherein the first optical inspecting surface is one of the two receiving surfaces.

19. The imaging lens assembly of claim 17, wherein the peripheral portion further comprises an axial aligning structure for coaxially disposing the plastic lens element and an imaging lens element adjacent thereto.

20. The imaging lens assembly of claim 16, wherein the plastic lens barrel has at least one parallel inner annular surface, a gap is formed between the peripheral surface of the plastic lens element and the at least one parallel inner annular surface of the plastic lens barrel, and the imaging lens assembly further comprises an adhesive disposed in the gap to bond the plastic lens element and the plastic lens barrel.

21. The imaging lens assembly of claim 16, wherein the plastic lens barrel has a parallel inner annular surface, and the peripheral surface of the plastic lens element and the parallel inner annular surface of the plastic lens barrel are correspondingly connected to each other.

22. The imaging lens assembly of claim 16, wherein the angle between the first optical inspecting surface and the second optical inspecting surface is θi, and the following condition is satisfied:

35 degrees≤θi≤55 degrees.

23. The imaging lens assembly of claim 16, wherein a refractive index of the plastic lens element is Nd, and the following condition is satisfied:

1.50<Nd<1.75.

24. The imaging lens assembly of claim 16, wherein the angle between the first optical inspecting surface and the second optical inspecting surface is θi, a critical angle of total internal reflection of the plastic lens element is θc, and the following condition is satisfied:

θi>θc.

* * * * *